(12) United States Patent
Kai et al.

(10) Patent No.: US 9,369,181 B2
(45) Date of Patent: Jun. 14, 2016

(54) CONTACTLESS POWER FEEDING APPARATUS

(75) Inventors: Toshihiro Kai, Yamato (JP);
Throngnumchai Kraisorn, Yokohama (JP); Yusuke Minagawa, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 566 days.

(21) Appl. No.: 13/884,438

(22) PCT Filed: Sep. 29, 2011

(86) PCT No.: PCT/JP2011/072339
§ 371 (c)(1),
(2), (4) Date: May 9, 2013

(87) PCT Pub. No.: WO2012/063570
PCT Pub. Date: May 18, 2012

(65) Prior Publication Data
US 2013/0221758 A1    Aug. 29, 2013

(30) Foreign Application Priority Data

Nov. 12, 2010   (JP) ................................. 2010-253851

(51) Int. Cl.
| H01F 27/42 | (2006.01) |
| H01F 38/00 | (2006.01) |
| H04B 5/00 | (2006.01) |
| H02J 5/00 | (2016.01) |

(52) U.S. Cl.
CPC .............. *H04B 5/0037* (2013.01); *H02J 5/005* (2013.01); *H04B 5/0093* (2013.01)

(58) Field of Classification Search
USPC ....................................................... 307/104
See application file for complete search history.

(56) References Cited

U.S. PATENT DOCUMENTS

| 8,432,066 | B2 | 4/2013 | Takada et al. |
| 2007/0056813 | A1 | 3/2007 | Eichenberg et al. |
| 2010/0115474 | A1 | 5/2010 | Takada et al. |
| 2011/0241440 | A1 | 10/2011 | Sakoda et al. |
| 2011/0316348 | A1 | 12/2011 | Kai et al. |
| 2012/0104998 | A1 | 5/2012 | Takada et al. |

FOREIGN PATENT DOCUMENTS

| EP | 2 357 717 A1 | 8/2011 |
| EP | 2 432 098 A1 | 3/2012 |
| JP | 2007-534289 A | 11/2007 |
| JP | 2010-040699 A | 2/2010 |
| JP | 2010-114965 A | 5/2010 |
| JP | 2010-130800 A | 6/2010 |
| JP | 2010-141976 A | 6/2010 |
| JP | 2010-183810 A | 8/2010 |
| JP | 2010-233442 A | 10/2010 |
| WO | WO 2010/101078 A1 | 9/2010 |

OTHER PUBLICATIONS

Chinese Office Action, Oct. 10, 2014, 6 pages.
Mexican Office Action, Mar. 4, 2014, 3 pages.

*Primary Examiner* — Fritz M Fleming
*Assistant Examiner* — Dru Parries
(74) *Attorney, Agent, or Firm* — Foley & Lardner LLP

(57) ABSTRACT

A contactless power feeding apparatus includes a secondary winding to which power is supplied from a primary winding by an AC power supply. An impedance absolute-value characteristic of Z1 has a frequency of a fundamental wave component to be between a frequency where a local maximum exists and that is nearest to the frequency of the fundamental wave component, and a frequency where a local minimum exists and that is nearest to the frequency of the fundamental wave component. An impedance absolute-value characteristic of Z2 has the frequency of the fundamental wave component to be between a frequency where the local maximum exists and that is nearest to the frequency of the fundamental wave component, and a frequency where the local minimum exists and that is nearest to the frequency of the fundamental wave component.

7 Claims, 20 Drawing Sheets

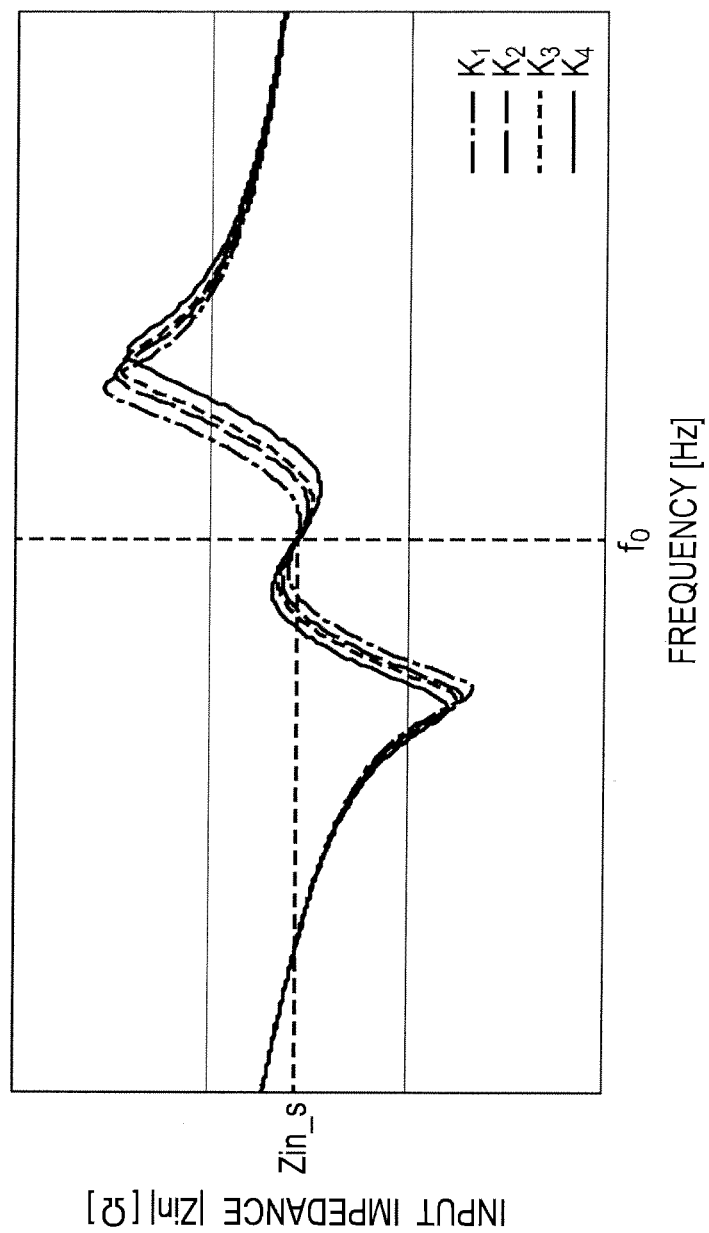

CONTACTLESS POWER FEEDING APPARATUS

TECHNICAL FIELD

The present invention relates to a contactless power feeding apparatus.

This application claims the benefit of priority of the prior Japanese Patent Application No. 2010-253851, filed on Nov. 12, 2010, the entire contents of which are incorporated herein by reference as part of this application, in the designated countries where incorporation of documents by reference is approved.

BACKGROUND ART

There is known a contactless power feeding apparatus which supplies electric power from a primary side to a secondary side provided in a movable body while keeping a close corresponding position in a contactless state with an air gap therebetween, based on a mutual induction action of an electromagnetic induction, in which, in a feeder circuit on the primary side, in-series capacitors for resonance synchronization are arranged for parallel coils, respectively, and the capacitors are connected in parallel with the coils, respectively. (Patent Literature 1)

CITATION LIST

Patent Literature

Patent Literature 1: Japanese Patent Application Publication No. 2010-40699

SUMMARY OF INVENTION

In the conventional contactless power feeding apparatus, however, the capacitors and the like are set assuming that a coefficient of coupling between the coil on the primary side and the coil on the secondary side is constant, which in turn leads to the problem of decreasing power feeding efficiency when the coupling coefficient varies.

Therefore, the present invention provides a contactless power feeding apparatus capable of suppressing a decrease in power feeding efficiency even under conditions where a coupling state varies.

In order to solve the foregoing problem, the present invention provides a configuration given below. A characteristic of impedance of just the primary side when viewed from the output side of an AC power supply has a frequency of a fundamental wave component of the AC power supply to be between a frequency where a local maximum exists and that is nearest to the frequency of the fundamental wave component of the AC power supply, and a frequency where a local minimum exists and that is nearest to the frequency of the fundamental wave component, and a characteristic of impedance of just the secondary side when viewed from the side of a load to be connected to a secondary winding has the frequency of the fundamental wave component to be between a frequency where the local maximum exists and that is nearest to the frequency of the fundamental wave component of the AC power supply, and a frequency where the local minimum exists and that is nearest to the frequency of the fundamental wave component.

According to the present invention, when the coupling coefficient varies within a predetermined range, the absolute-value characteristic of input impedance with respect to the frequency of the fundamental wave component is such that the absolute value of the input impedance varies in the vicinity of a predetermined impedance value, and the phase characteristic of the input impedance with respect to the frequency of the fundamental wave component is such that the phase of the input impedance varies in the vicinity of a predetermined phase. Thus, even under conditions where a coupling state varies, a change in the input impedance when viewed from the output side of the AC power supply side can be suppressed, and, as a result, a decrease in power feeding efficiency can be suppressed.

BRIEF DESCRIPTION OF DRAWINGS

FIG. 8a is a graph illustrating the impedance characteristic with respect to frequency in the circuit of FIG. 7a.

FIG. 9a is a graph illustrating the characteristic of the absolute value of the input impedance with respect to the coupling coefficient in the contactless power feeding apparatus of FIG. 1.

FIG. 11a is a graph illustrating the characteristic of the absolute value of the impedance with respect to the frequency in the circuit of FIG. 7a.

FIG. 11b is a graph illustrating the characteristic of the absolute value of the impedance with respect to the frequency in the circuit of FIG. 7a.

DESCRIPTION OF EMBODIMENTS

Embodiments of the present invention will be described below with reference to the drawings.

First Embodiment

A contactless power feeding apparatus for use in conjunction with a vehicle battery and a power load for an electric vehicle or the like will be described as an example of a contactless power supply circuit device according to an embodiment of the invention.

Figure 1:
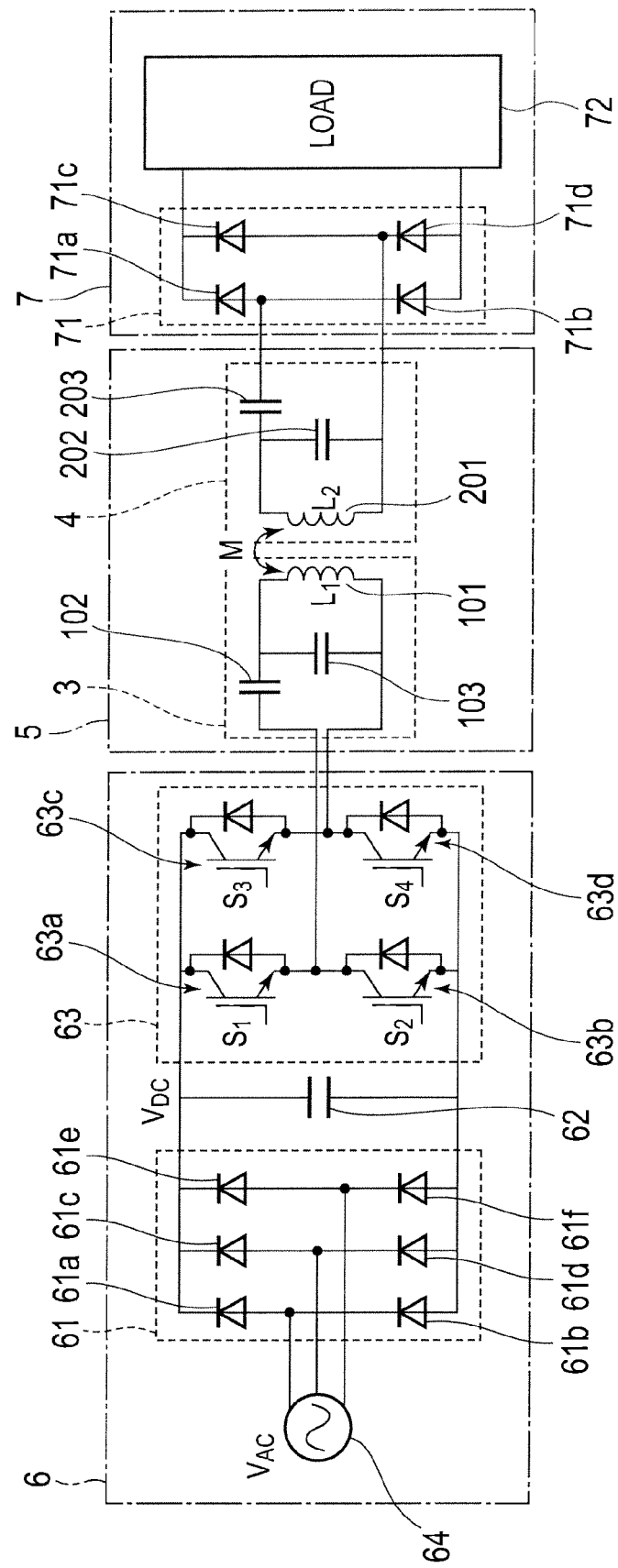
FIG. 1 is an electrical circuit diagram of a contactless power feeding apparatus according to an embodiment of the present invention.

FIG. 1 illustrates an electrical circuit diagram of the contactless power feeding apparatus. The contactless power feeding apparatus according to the first embodiment includes a high-frequency AC power supply unit 6, a contactless power feeding unit 5 to provide contactless power feeding of output power from the high-frequency AC power supply circuit unit 6, and a load unit 7 supplied with the power by the contactless power feeding unit 5.

The high-frequency AC power supply unit 6 includes a three-phase AC power supply 64, a rectifier 61 connected to the three-phase AC power supply 64 and configured to rectify three-phase alternating current to direct current, and a voltage control type inverter 63 connected via a smoothing capacitor 62 to the rectifier 61 and configured to inversely transform the rectified current into high-frequency power. The rectifier 61 includes three parallel combinations of a diode 61a and a diode 61b, a diode 61c and a diode 61d, and a diode 61e and a diode 61f, and outputs of the three-phase AC power supply 64 are connected to intermediate points of connections between the diodes, respectively. The voltage control type inverter 63 includes a parallel connection of a series circuit formed of a switching element 63a having an antiparallel connection of a diode to a power transistor constructed of a MOSFET (metal oxide semiconductor field effect transistor) or the like and a switching element 63b having the same configuration as the switching element 63a, and a series circuit formed of a switching element 63c and a switching element 63d each having the same configuration as above described, and this parallel arrangement of the series circuits is connected via the smoothing capacitor 62 to the rectifier 61. Then, an intermediate point of connection between the switching element 63a and the switching element 63b and an intermediate point of connection between the switching element 63c and the switching element 63d are connected to a power transmitting circuit unit 3 as the primary side of the contactless power feeding unit 5. The voltage control type inverter 63 supplies AC power on the order of a few kHz to 100 kHz to the contactless power feeding unit 5.

It is assumed here that an output waveform which the high-frequency AC power supply unit 6 outputs to the contactless power feeding unit 5 is a periodically changing waveform and the output waveform has a frequency $f_0$. Also, when the output waveform contains distortion (or when the output waveform is a rectangular wave, for example), a frequency of a fundamental sine wave possessed by a periodic function of the waveform containing the distortion becomes equal to the frequency ($f_0$). Hereinafter, as employed in the present invention, these frequencies will be collectively called the frequency ($f_0$) of a fundamental wave component of the high-frequency AC power supply unit 6. Incidentally, the high-frequency AC power supply unit 6 is not necessarily required to be formed of the circuit illustrated in FIG. 1 but may be formed of other circuits.

The contactless power feeding unit 5 includes the power transmitting circuit unit 3 as the input side of a transformer, and a power receiving circuit unit 4 as the output side of the transformer. The power transmitting circuit unit 3 includes a primary winding 101, a capacitor 102 connected in series with the primary winding 101, and a capacitor 103 connected in parallel with the primary winding 101, and the power receiving circuit unit 4 includes a secondary winding 201, a capacitor 202 connected in parallel with the secondary winding 201, and a capacitor 203 connected in series with the secondary winding 201.

The load unit 7 includes a rectifier unit 71 to rectify AC power supplied from the contactless power feeding unit 5 to direct current, and a load 72 connected to the rectifier unit 71.

The rectifier unit 71 includes parallel combinations of a diode 71a and a diode 71b, and a diode 71c and a diode 71d, and outputs of the power receiving circuit unit 4 are connected to intermediate points of connections between the diodes, respectively. Then, an output of the rectifier unit 71 is connected to the load 72.

Next, description will be given with reference to FIGS. 2a, 2b, 3 and 4 with regard to a coefficient of coupling (κ) between the primary winding 101 and the secondary winding 201 when the contactless power supply circuit device illustrated in FIG. 1 is provided in a vehicle and a parking space.

In the embodiment, the power receiving circuit unit 4 including the secondary winding 201 and the load unit 7 are provided in the vehicle for example, and the power transmitting circuit unit 3 including the primary winding 101 and the high-frequency AC power supply unit 6 are provided as the ground side in the parking space for example. In the case of the electric vehicle, the load 72 corresponds to a secondary battery, for example. The secondary winding 201 is provided in a chassis of the vehicle, for example. Then, a vehicle driver parks the vehicle in the parking space in such a manner that the secondary winding 201 is placed over the primary winding 101, and power is supplied from the primary winding 101 to the secondary winding 201 thereby to charge the secondary battery included in the load 72.

Figure 2A:
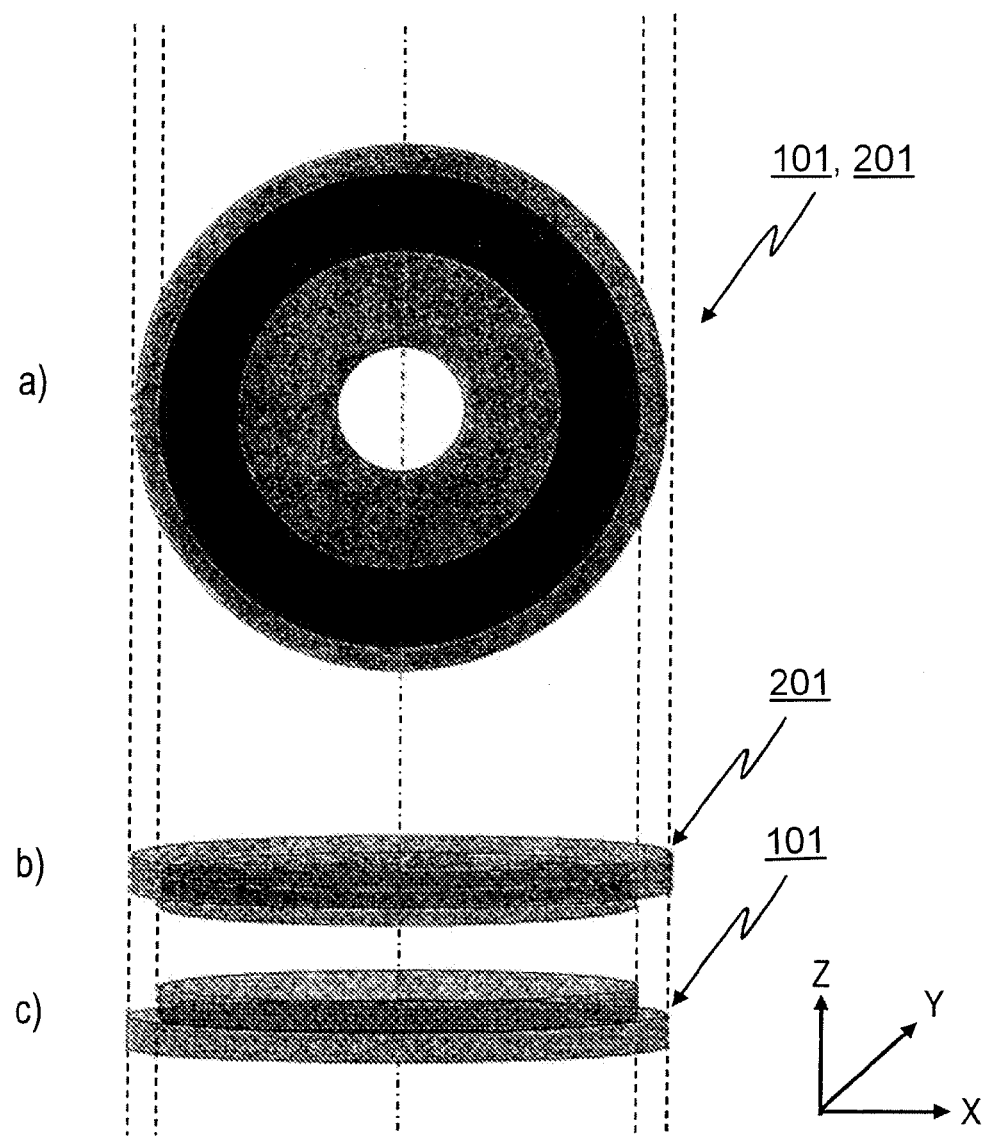
FIG. 2a is a plan view and perspective views illustrating a primary winding and a secondary winding of FIG. 1 as facing each other.
Figure 2B:
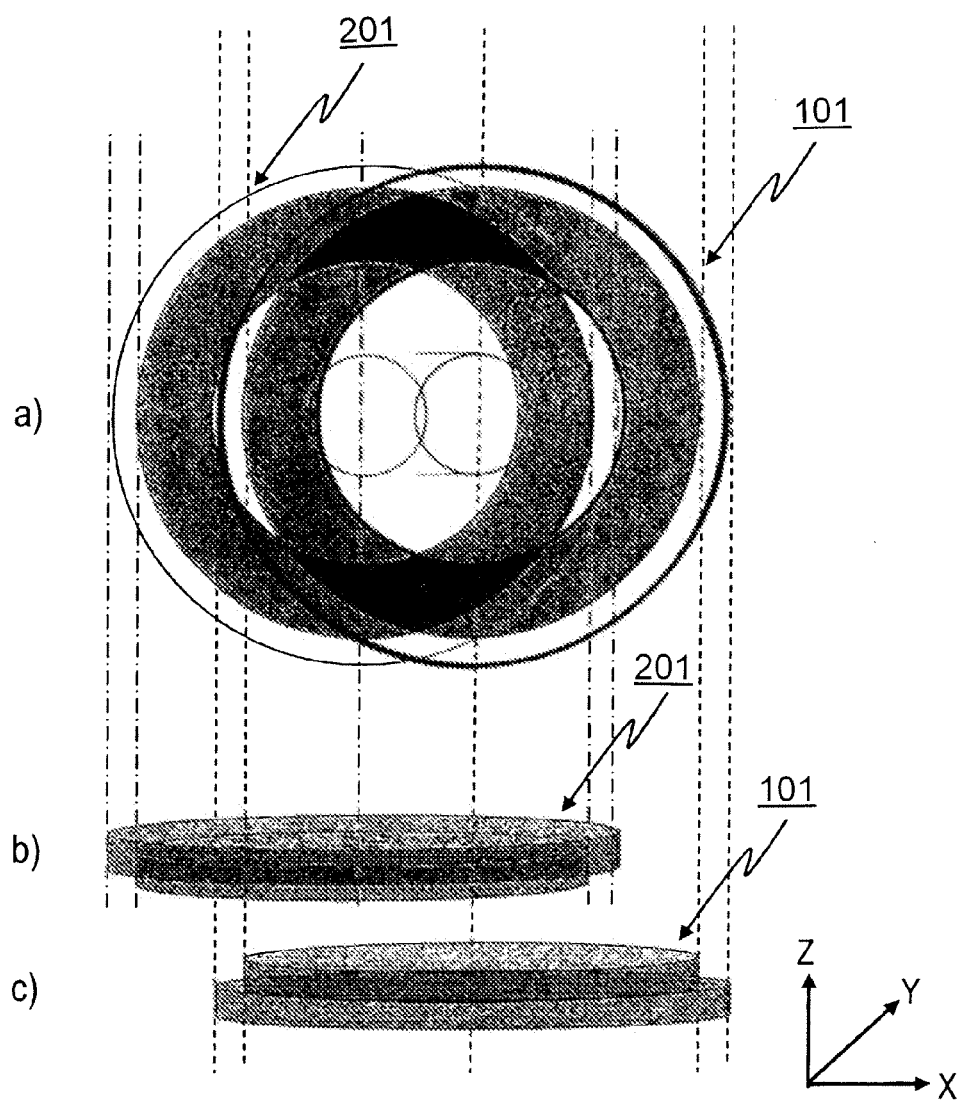
FIG. 2b is a plan view and perspective views illustrating the primary winding and the secondary winding of FIG. 1 as facing each other, illustrating the primary winding and the secondary winding as displaced from each other in the direction of the X axis.

FIGS. 2a and 2b each illustrate, in a plan view a) and perspective views b), c), the primary winding 101 and the secondary winding 201 as facing each other. In FIGS. 2a and 2b, the X axis and the Y axis indicate the two-dimensional directions of the primary winding 101 and the secondary winding 201, and the Z axis indicates the height direction thereof. Incidentally, both the primary winding 101 and the secondary winding 201 are of the same circular shape for the sake of the description; however, in the embodiment, the primary winding 101 and the secondary winding 201 are neither necessarily required to be in circular form nor required to be identical in shape.

Now, as illustrated in FIG. 2a, it is desirable that the vehicle be parked in the parking space in such a manner that the secondary winding 201 coincides with the primary winding 101 in the directions of the X axis and the Y axis as the two-dimensional directions; however, as illustrated in FIG. 2b, the relative positions of the primary winding 101 and the secondary winding 201 may be displaced from each other in the two-dimensional directions, depending on driver's skill. Also, the height of the vehicle varies according to the type of vehicle or the amount of loading, and therefore, a distance between the primary winding 101 and the secondary winding 201 in the height direction Z varies also according to the vehicle height.

When power supplied from the high-frequency AC power supply 6 to the primary winding 101 is set constant, the efficiency of reception of power by the secondary winding 201 is highest when the secondary winding 201 is in a position coinciding with the primary winding 101 (which corresponds to a position illustrated in FIG. 2a), while the efficiency is low when a point of center of the secondary winding 201 is far away from a point of center of the primary winding 101.

Figure 3:
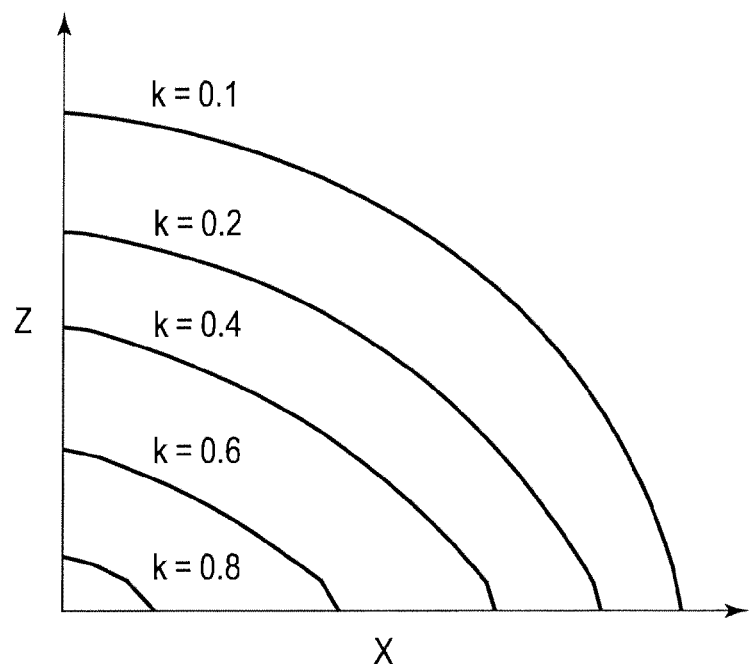
FIG. 3 is a graph illustrating a change in coupling coefficient with respect to the secondary winding 201 in the direction of the X axis (or the direction of the Y axis) and the direction of the Z axis illustrated in FIGS. 2a and 2b.

FIG. 3 illustrates a change in the coupling coefficient with respect to the secondary winding 201 in the direction of the X axis (or the direction of the Y axis) and the direction of the Z axis illustrated in FIGS. 2a and 2b. As illustrated in FIG. 3, when the center of the primary winding 101 coincides with the center of the secondary winding 201, there is a small amount of leakage flux between the primary winding 101 and the secondary winding 201, the value of the X axis in FIG. 3 corresponds to zero, and the coupling coefficient κ is high.

Meanwhile, when the positions of the primary winding 101 and the secondary winding 201 are displaced relative to each other in the direction of the X axis as illustrated in FIG. 2b in contrast to FIG. 2a, there is a large amount of leakage flux, and the coupling coefficient κ is low as illustrated in FIG. 3. Also, when there is a large amount of displacement of the primary winding 101 and the secondary winding 201 relative to each other in the direction of the Z axis (or the height), the coupling coefficient κ is low.

Figure 4:
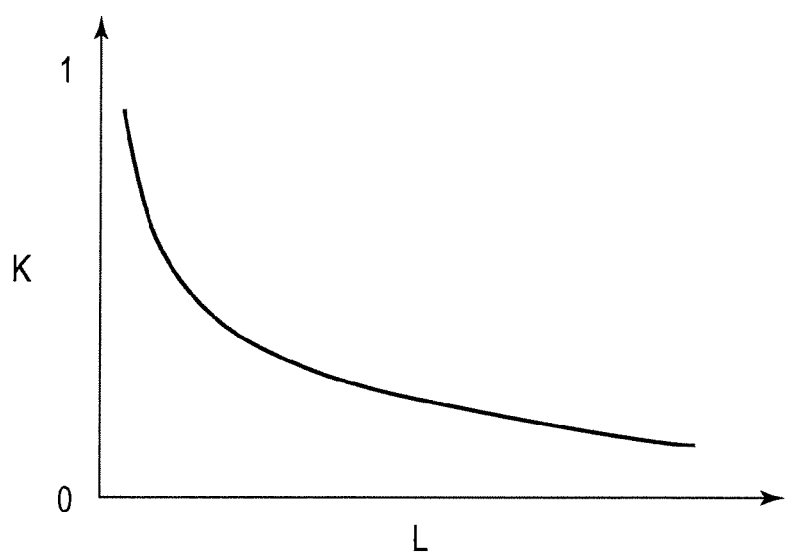
FIG. 4 is a graph illustrating the characteristic of the coupling coefficient with respect to a distance between the primary winding and the secondary winding of FIG. 1.

FIG. 4 is a graph illustrating the characteristic of the coupling coefficient with respect to the distance (L) between the primary winding 101 and the secondary winding 201. It is to be noted that the distance (L) is represented by Equation (1).

$$L=\sqrt{X^2++Z^2} \tag{1}$$

As illustrated in FIG. 4, an increase in the distance (L) leads to an increase in the amount of leakage flux and hence to a decrease in the coupling coefficient (κ).

Figure 5A:
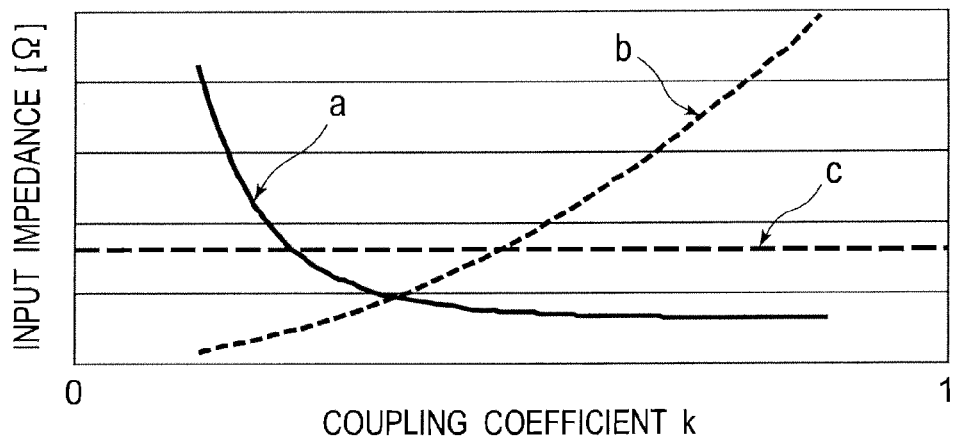
FIG. 5a is a graph illustrating an input impedance characteristic with respect to the coupling coefficient in the conventional contactless power feeding apparatus.

Incidentally, in the conventional contactless power feeding apparatus, the coupling coefficient is set to a fixed value, and a circuit design is prepared for a contactless power feeding portion. As described above, therefore, when the coupling coefficient (κ) varies by displacement of the relative positions of coils in the power feeding portion from each other, there is a significant change in input impedance of a power feeding circuit including the contactless coils when viewed from the output side of the AC power supply. Here, description will be given with reference to FIG. 5a with regard to a change in impedance characteristic with respect to the coupling coefficient (κ) in the conventional contactless power feeding apparatus. FIG. 5a is a graph illustrating the characteristic of the absolute value of the input impedance with respect to the coupling coefficient (κ) in the conventional contactless power feeding apparatus. Incidentally, the input impedance is the impedance when viewed from the output side of the AC power supply, and is the impedance at the frequency of the fundamental wave component of the AC power supply. A graph a indicates the characteristic of a circuit (hereinafter called a conventional circuit a) in which a capacitor is designed so as to be tuned with a predetermined coupling coefficient, disclosed in Japanese Patent Application Publication No. 2010-40699, and a graph b indicates the characteristic of a circuit (hereinafter called a conventional circuit b) in which a capacitor is designed so as to be tuned with a predetermined coupling coefficient, disclosed in Japanese Patent Application Publication No. 2007-534289.

As indicated by the graph a in FIG. 5a, in the conventional circuit a, the absolute value of the input impedance is high when the coupling coefficient is low, while the absolute value of the input impedance becomes lower as the coupling coefficient becomes higher. Also, as indicated by the graph b, in the conventional circuit b, the absolute value of the input impedance is high when the coupling coefficient is low, while the absolute value of the input impedance becomes lower as the coupling coefficient becomes higher. In other words, the circuit design is prepared for the conventional circuit a and the conventional circuit b, assuming that the coefficient of coupling between the coils as the contactless power feeding portion is constant, and therefore, a change in the coupling coefficient causes a significant change in the input impedance of the power feeding circuit. Incidentally, a graph c indicates the absolute value of the impedance of the AC power supply, the details of which will be described later.

Figure 5B:
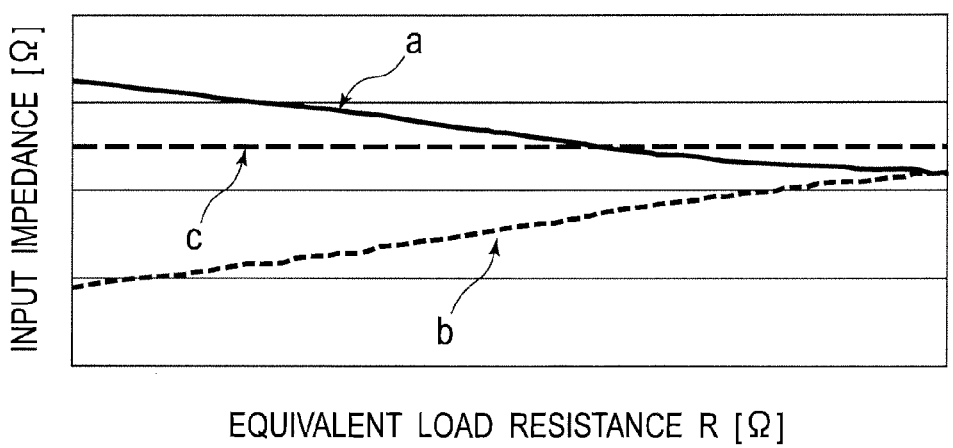
FIG. 5b is a graph illustrating the characteristic of the absolute value of the input impedance with respect to equivalent load resistance in the conventional contactless power feeding apparatus.

As indicated by a graph a in FIG. 5b, in the conventional circuit a, the absolute value of the input impedance is high when equivalent load resistance is low, while the absolute value of the input impedance becomes lower as the equivalent load resistance becomes higher. Also, as indicated by a graph b, in the conventional circuit b, the absolute value of the impedance is high when the equivalent load resistance is low, while the absolute value of the impedance becomes lower as the equivalent load resistance becomes higher. In other words, in the conventional circuit a and the conventional circuit b, a change in the equivalent load resistance causes a significant change in the input impedance of the power feeding circuit. Incidentally, a graph c indicates the absolute value of the impedance of the AC power supply, the details of which will be described later.

Figure 5C:
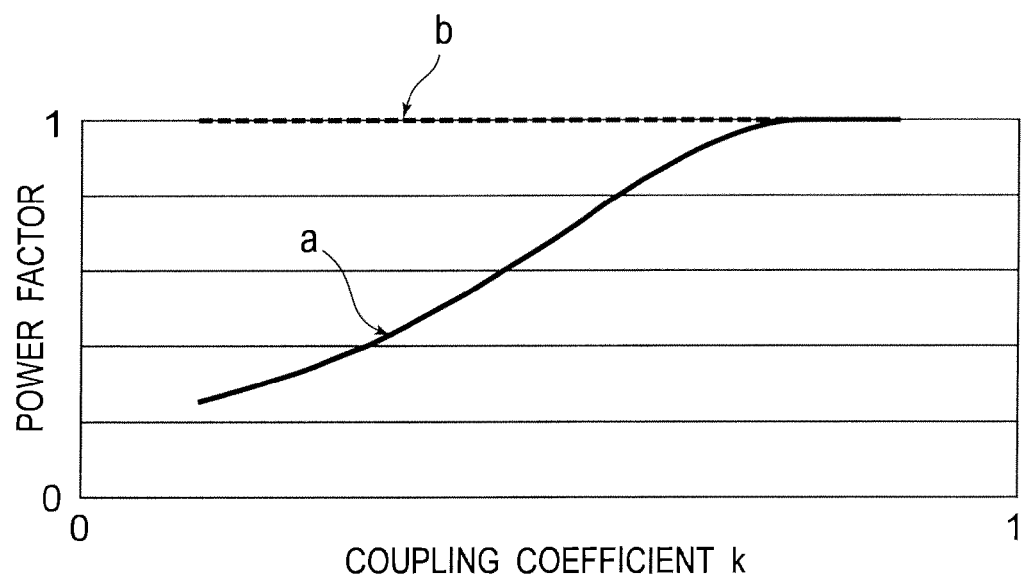
FIG. 5c is a graph illustrating the characteristic of a power factor with respect to the coupling coefficient in the conventional contactless power feeding apparatus.

Next, description will be given with reference to FIG. 5c with regard to a change in power factor involved in a change in the coupling coefficient in the conventional circuit a and the conventional circuit b. FIG. 5c illustrates the characteristic of the power factor with respect to the coupling coefficient (κ) in the conventional circuits a and b. Incidentally, the power factor (cos θ) is the cosine value of a phase difference (θ) between input voltage and input current which the AC power supply inputs to the power feeding circuit. As indicated by a graph a in FIG. 5c, in the conventional circuit a, the power factor is high when the coupling coefficient is high, while the power factor becomes low when the coupling coefficient becomes low. Meanwhile, as indicated by a graph b in FIG. 5c, in the conventional circuit b, the power factor remains high with respect to the change in the coupling coefficient.

Figure 6:
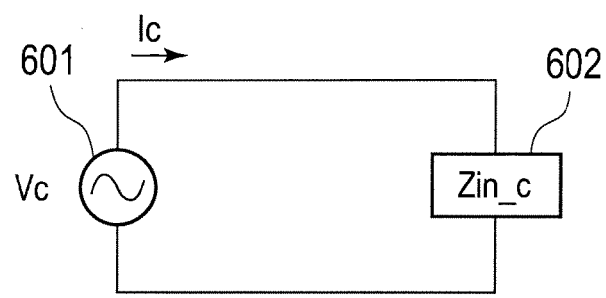
FIG. 6 is a circuit diagram illustrating an equivalent circuit on the primary side of FIG. 1.

Next, description will be given with reference to FIG. 6 with regard to a relationship between the impedance (Zc) of the AC power supply and the input impedance ($Z_{in\_c}$) of the power feeding circuit including the contactless coils. FIG. 6 is a circuit diagram of an equivalent circuit on the primary side of the contactless power feeding apparatus. An AC power supply 601 is the AC power supply provided on the primary side of the contactless power feeding apparatus, and supplies AC power to the coil on the primary side. Vc indicates AC voltage of the AC power supply 601, and Ic indicates alternating current outputted by the AC power supply 601. An impedance 602 is the input impedance ($Z_{in\_c}$) of the power feeding circuit including the contactless coils. The rated values of the AC power supply 601 are predetermined, and, for example, it is assumed that a maximum voltage of the AC power supply 601 is 300 [V], a maximum current thereof is 30 [A], and maximum power thereof is 9 [kW].

Then, description will be given with regard to an instance where the input impedance ($Z_{in\_c}$) of the impedance 602 is 1 [Ω]. When a voltage of 300 [V] as the maximum voltage of the AC power supply is applied to the impedance 602, a current of 300 [A] flows through the power feeding circuit as the impedance 602. However, the maximum current of the AC power supply 601 is 30 [A], and thus, a current flowing through the power feeding circuit is 30 [A], and the voltage of the power feeding circuit is 30 [V]. Therefore, power supplied to the power feeding circuit as the impedance 602 is 900 [W], and the maximum power of the AC power supply 601 cannot be supplied to the power feeding circuit.

Also, description will be given with regard to an instance where the input impedance ($Z_{in\_c}$) of the impedance 602 is 100 [Ω]. When a voltage of 300 [V] as the maximum voltage of the AC power supply is applied to the impedance 602, a current of 3 [A] flows through the power feeding circuit as the impedance 602. Although the maximum current of the AC power supply 601 is 30 A, the input impedance ($Z_{in\_c}$) is high and thus a current flowing through the power feeding circuit is 3 [A]. Then, the voltage of the power feeding circuit is 300 [V]. Therefore, power supplied to the power feeding circuit as the impedance 602 is 900 [W], and the maximum power of the AC power supply 601 cannot be supplied to the power feeding circuit.

Also, description will be given with regard to an instance where the input impedance ($Z_{in\_c}$) of the impedance 602 is 10 [Ω]. When a voltage of 300 [V] as the maximum voltage of the AC power supply is applied to the impedance 602, a current of 30 [A] flows through the power feeding circuit as the impedance 602, and the maximum current of the AC power supply 601 flows through the power feeding circuit. Therefore, power supplied to the power feeding circuit as the impedance 602 is 900 [W], and the maximum power of the AC power supply 601 can be supplied to the power feeding circuit.

In other words, when the input impedance ($Z_{in\_c}$) of the impedance 602 varies with respect to the impedance of the AC power supply 601, the maximum power of the AC power supply 601 cannot be efficiently supplied to the power feeding circuit. Then, as illustrated in FIG. 5a, the input impedance of the conventional circuits a and b varies greatly with respect to the impedance of the AC power supply (refer to the graph c), and therefore, the maximum power of the AC power supply 601 cannot be efficiently supplied to the power feeding circuit.

Also, as described later, it is required that the power factor (cos θ) be maintained at a high value in order to prevent a loss of power when the power feeding circuit supplies power to the load. As illustrated in FIG. 5c, in the conventional circuit a, the power factor decreases when the coupling coefficient varies, and therefore, the loss of power supplied to the load becomes worse in the contactless power feeding apparatus using the conventional circuit a as the power feeding circuit.

In the contactless power feeding apparatus of the embodiment, therefore, conditions for the magnitude of inductance of the primary winding 101 and the secondary winding 201 and the magnitude of capacitance of the capacitors 102, 103, 202, 203 are set so that the characteristic of impedance of just the primary side when viewed from the output side of the high-frequency AC power supply circuit 6 and the characteristic of impedance of just the secondary side when viewed from the side of the load unit 7 to be connected to the secondary winding 201 are characteristics as given below, and thereby, under conditions where a coupling state varies, a change in input impedance when viewed from the output side of the high-frequency AC power supply circuit 6 is suppressed, and also, the phase of the input impedance is brought near to zero.

Figure 7A:
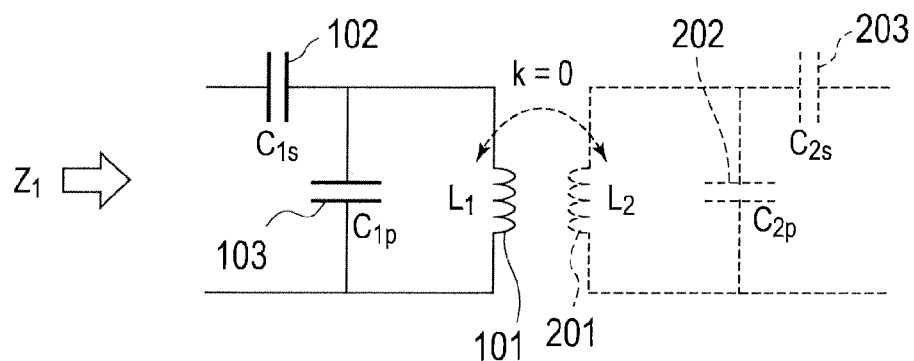
FIG. 7a is a circuit diagram of a circuit on the primary side in the circuit diagram of a contactless power feeding unit of FIG. 1.
Figure 7B:
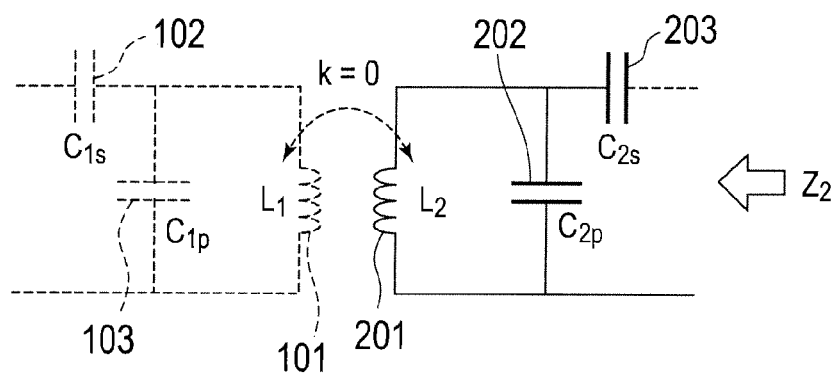
FIG. 7b is a circuit diagram of a circuit on the secondary side in the circuit diagram of the contactless power feeding unit of FIG. 1.

Firstly, description will be given with regard to impedance ($Z_1$) and impedance ($Z_2$) in the contactless power feeding apparatus of the embodiment. As illustrated in FIG. 7a, the impedance ($Z_1$) is the impedance of just the primary side when viewed from the high-frequency AC power supply 6 side (or the power transmitting side), with the coupling coefficient set to zero, in the circuit illustrated in FIG. 1. Also, as illustrated in FIG. 7b, the impedance ($Z_2$) is the impedance of just the secondary side when viewed from the load unit 7 side (or the power receiving side), with the coupling coefficient set to zero, in the circuit illustrated in FIG. 1. FIG. 7a is a circuit diagram of assistance in explaining the impedance ($Z_1$), illustrating a circuit on just the primary side of the contactless power feeding unit 5, and FIG. 7b is a circuit diagram of assistance in explaining the impedance ($Z_2$), illustrating a circuit on just the secondary side of the contactless power feeding unit 5.

Incidentally, as illustrated in FIGS. 7a and 7b, $C_{1s}$ denotes the electrical capacitance of the capacitor 102; $C_{1p}$, the electrical capacitance of the capacitor 103; $L_1$, the inductance of the primary winding 101; $C_{2p}$, the electrical capacitance of the capacitor 202; $C_{2s}$, the electrical capacitance of the capacitor 203; and $L_2$, the inductance of the secondary winding 201.

Figure 8A:
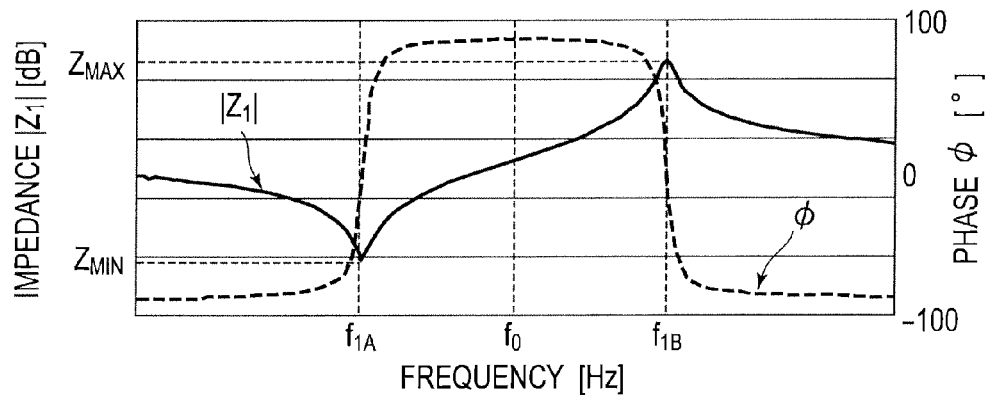
Figure 8B:
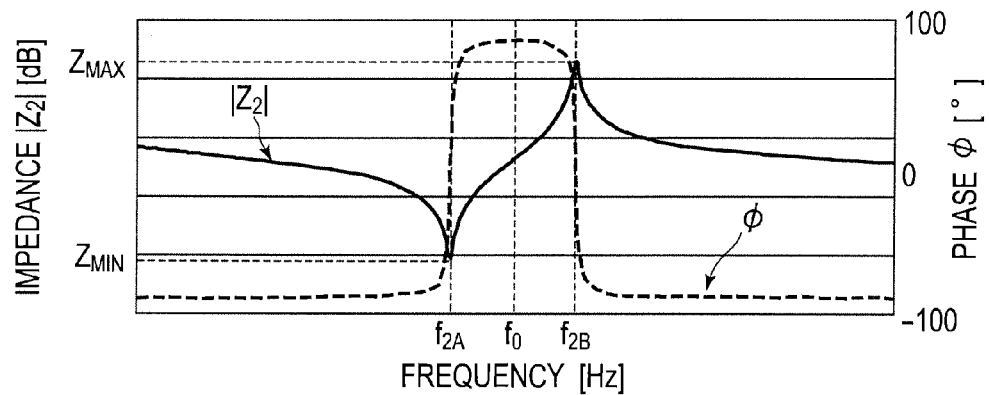
FIG. 8b is a graph illustrating the impedance characteristic with respect to the frequency in the circuit of FIG. 7b.

In the contactless power feeding apparatus of the embodiment, the characteristics of the absolute values of the impedance ($Z_1$) and the impedance ($Z_2$) have characteristics illustrated in FIGS. 8a and 8b, respectively. FIG. 8a is a graph illustrating the absolute-value characteristic and phase characteristic ($\phi$) of the impedance ($Z_1$) with respect to the frequency, and FIG. 8b is a graph illustrating the absolute-value characteristic and phase characteristic ($\phi$) of the impedance ($Z_2$) with respect to the frequency.

Specifically, as illustrated in FIG. 8a, the characteristic of the absolute value of the impedance ($Z_1$) has the frequency ($f_0$) of the fundamental wave component of the high-frequency AC power supply circuit 6 to be between a frequency ($f_{1A}$) where a local minimum ($Z_{MIN}$) exists, and a frequency ($f_{1B}$) where a local maximum ($Z_{MAX}$) exists. Of resonance frequencies of the impedance ($Z_1$), the frequency ($f_{1A}$) is the frequency that is nearest to the frequency ($f_0$), and, of the resonance frequencies of the impedance ($Z_1$), the frequency ($f_{1B}$) is the frequency that is nearest to the frequency ($f_0$). Also, the frequency ($f_{1B}$) is higher than the frequency ($f_{1A}$). In other words, the characteristic of the impedance ($Z_1$) is the characteristic that the frequency ($f_0$) lies between the frequency ($f_{1A}$) of the local minimum ($Z_{MIN}$) and the frequency ($f_{1B}$) of the local maximum ($Z_{MAX}$).

As illustrated in FIG. 8b, the characteristic of the absolute value of the impedance ($Z_2$) has the frequency ($f_0$) of the fundamental wave component of the high-frequency AC power supply circuit 6 to be between a frequency ($f_{2A}$) where the local minimum ($Z_{MIN}$) exists, and a frequency ($f_{2B}$) where the local maximum ($Z_{MAX}$) exists. Of resonance frequencies of the impedance ($Z_2$), the frequency ($f_{2A}$) is the frequency that is nearest to the frequency ($f_0$), and, of the resonance frequencies of the impedance ($Z_2$), the frequency ($f_{2B}$) is the frequency that is nearest to the frequency ($f_0$). Also, the frequency ($f_{2B}$) is higher than the frequency ($f_{2A}$). In other words, the characteristic of the impedance ($Z_2$) is the characteristic that the frequency ($f_0$) lies between the frequency ($f_{2A}$) of the local minimum ($Z_{MIN}$) and the frequency ($f_{2B}$) of the local maximum ($Z_{MAX}$).

Next, description will be given with regard to the electrical capacitance of the capacitors 102, 103, 202, 203 and the inductance of the primary winding 101 and the secondary winding 201 in the embodiment.

The resonance frequency ($f_{1A}$) and the resonance frequency ($f_{1B}$) of the impedance ($Z_1$) are represented by Equation (2) and Equation (3), respectively, based on the circuit illustrated in FIG. 7a.

$$f_{1A} = \frac{1}{2\pi\sqrt{L_1(C_{1s} + C_{1p})}} \quad (2)$$

$$f_{1B} = \frac{1}{2\pi\sqrt{L_1 C_{1p}}} \quad (3)$$

Then, as illustrated in FIG. 8a, the following relationship is established for the frequency ($f_{1A}$) and the frequency ($f_{1B}$) represented by Equation (2) and Equation (3), respectively: $f_{1A} < f_0 < f_{1B}$. The relationship corresponds to the fact that the resonance frequency ($f_{1B}$) of a resonance system formed of $L_1$ and $C_{1p}$ is set higher than the frequency ($f_0$) and the resonance frequency ($f_{1A}$) of a resonance system formed of $L_1$ and ($C_{1p}+C_{1s}$) is set lower than the frequency ($f_0$).

The resonance frequency ($f_{2A}$) and the resonance frequency ($f_{2B}$) of the impedance ($Z_2$) are represented by Equation (4) and Equation (5), respectively, based on the circuit illustrated in FIG. 7b.

$$f_{2A} = \frac{1}{2\pi\sqrt{L_2(C_{2S} + C_{2p})}} \quad (4)$$

$$f_{2B} = \frac{1}{2\pi\sqrt{L_2 C_{2p}}} \quad (5)$$

Then, as illustrated in FIG. 8b, the following relationship is established for the frequency ($f_{2A}$) and the frequency ($f_{2B}$) represented by Equation (4) and Equation (5), respectively: $f_{2A} < f_0 < f_{2B}$. The relationship corresponds to the fact that the resonance frequency ($f_{2B}$) of a resonance system formed of $L_2$ and $C_{2p}$ is set higher than the frequency ($f_0$) and the resonance frequency ($f_{2A}$) of a resonance system formed of $L_2$ and ($C_{2p}+C_{2s}$) is set lower than the frequency ($f_0$).

In other words, the inductance ($L_1$), the electrical capacitance ($C_{1p}$), the electrical capacitance ($C_{1s}$), the inductance ($L_2$), the electrical capacitance ($C_{2p}$) and the electrical capacitance ($C_{2s}$) are set so that the following relationships are satisfied for the frequency ($f_0$) of the fundamental wave component of the high frequency AC power supply circuit 6: $f_{1A} < f_0 < f_{1B}$; and $f_{2A} < f_0 < f_{2B}$, and thereby, the characteristic of the impedance ($Z_1$) and the characteristic of the impedance ($Z_2$) illustrated in FIG. 8 can be possessed.

In the embodiment, further, the resonance frequencies ($f_{1A}$, $f_{1B}$, $f_{2A}$, $f_{2B}$) and the frequency ($f_0$) of the fundamental wave component of the high frequency AC power supply circuit 6 satisfy a condition represented by Equation (6).

$$f_{1A} \leq f_{2A} < f_0 < f_{2B} \leq f_{1B} \quad (6)$$

In other words, a frequency band between the frequency ($f_{1A}$) and the frequency ($f_{1B}$) lies within a frequency band between the frequency ($f_{2A}$) and the frequency ($f_{2B}$).

Figure 9B:
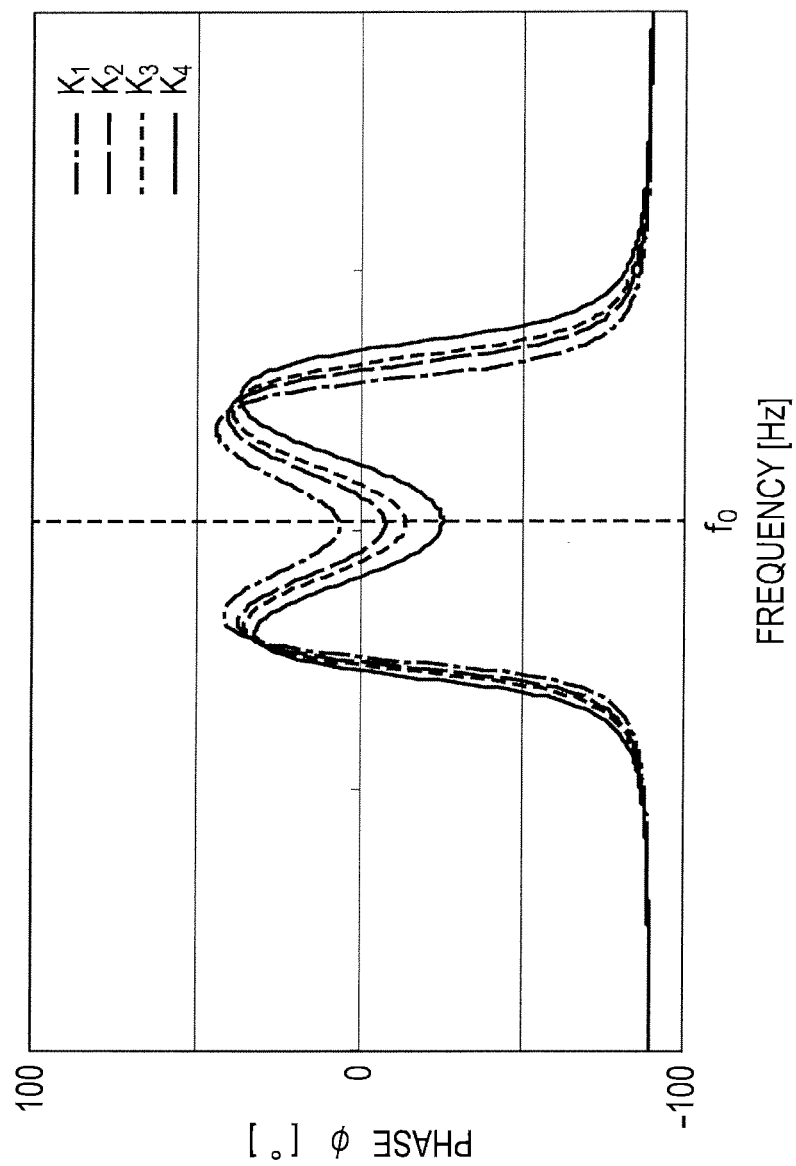
FIG. 9b is a graph illustrating a phase characteristic of the input impedance with respect to the coupling coefficient in the contactless power feeding apparatus of FIG. 1.

Next, description will be given with reference to FIGS. 9a and 9b with regard to the absolute-value characteristic and the phase characteristic ($\phi$) of the input impedance ($Z_{in}$) of the contactless power feeding apparatus of the embodiment. FIG. 9a illustrates the absolute-value characteristic of the input impedance ($Z_{in}$) with respect to the frequency, and FIG. 9b illustrates the phase characteristic ($\phi$) of the input impedance ($Z_{in}$) with respect to the frequency. $\kappa_1$ to $\kappa_4$ indicate the coupling coefficients, and $\kappa_1$ indicates the lowest coupling coefficient and $\kappa_4$ indicates the highest coupling coefficient. The input impedance ($Z_{in}$) indicates the input impedance of the contactless power feeding unit 5 when viewed from the output side of the high-frequency AC power supply circuit 6.

As illustrated in FIG. 9a, when the coupling coefficient ($\kappa$) varies within a range of $\kappa_1$ to $\kappa_4$, the absolute value of the input impedance ($Z_{in}$) with respect to the frequency ($f_0$) of the fundamental wave component of the high-frequency AC power supply circuit 6 is the absolute value ($|Z_{in\_s}|$). Specifically, when the coupling coefficient ($\kappa$) varies within the range of $\kappa_1$ to $\kappa_4$ by displacement of the position of the secondary winding 201 relative to that of the primary winding 101, the absolute value ($|Z_{in\_s}|$) of the input impedance remains constant, or the absolute value ($|Z_{in\_s}|$) of the input impedance varies within a narrow range of variation, and therefore, a change in the input impedance ($Z_{in}$) with respect to the frequency ($f_0$) is suppressed. Thus, in the embodiment, the impedance ($Z_1$) and the impedance ($Z_2$) have the characteristics illustrated in FIGS. 7a and 7b, and thereby, a change in the absolute value of the input impedance ($Z_{in}$) with respect to the frequency ($f_0$) can be suppressed when the coupling coefficient varies. Incidentally, when the coupling coefficient ($\kappa$) varies within the range of $\kappa_1$ to $\kappa_4$, the absolute value of the input impedance ($Z_{in}$) with respect to the frequency ($f_0$) does not need to remain constant at the absolute value ($|Z_{in\_s}|$) as illustrated in FIG. 9a but may vary in the vicinity of the absolute value ($|Z_{in\_s}|$).

Also, as illustrated in FIG. 9b, when the coupling coefficient ($\kappa$) varies within the range of $\kappa_1$ to $\kappa_4$, the phase of the input impedance ($Z_{in}$) with respect to the frequency ($f_0$) of the fundamental wave component of the high-frequency AC power supply circuit 6 varies in the vicinity of zero. When the phase of the input impedance ($Z_{in}$) with respect to the frequency ($f_0$) varies in the vicinity of zero with respect to a change in the coupling coefficient, the power factor can be maintained near 1, and thus, a power loss in the contactless power feeding unit 5 can be suppressed, so that power can be efficiently supplied to the load unit 7.

Figure 10A:
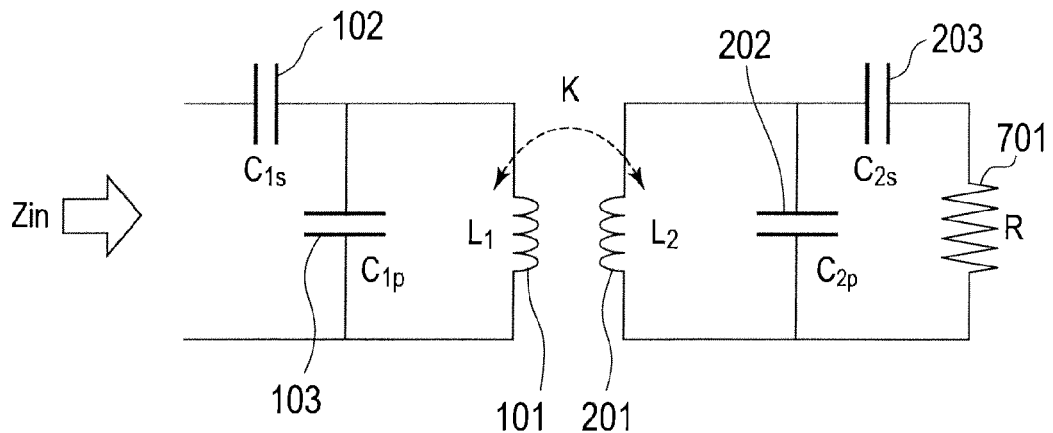
FIG. 10a is a circuit diagram illustrating an equivalent circuit of the contactless power feeding unit and a load unit of FIG. 1.
Figure 10B:
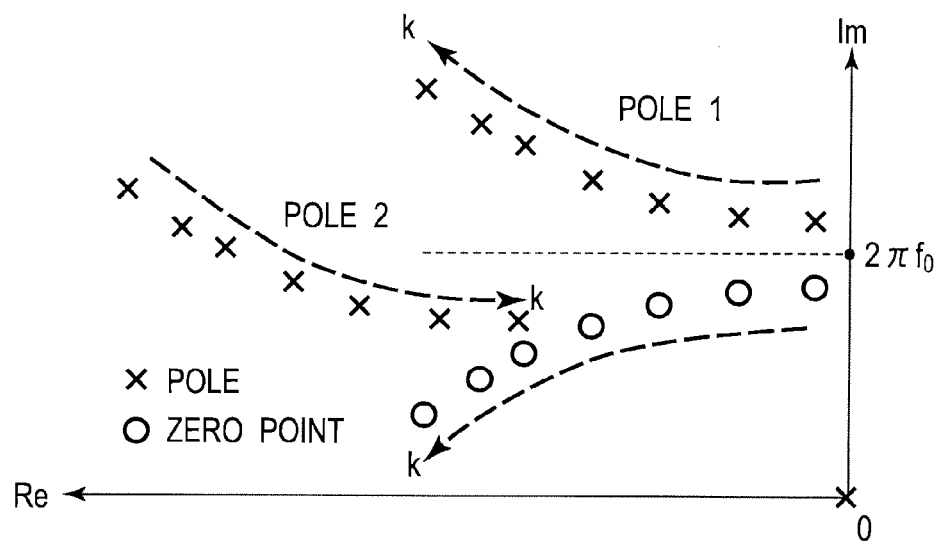
FIG. 10b is a representation illustrating poles and zero points of the input impedance ($Z_{in}$) of the contactless power feeding unit of FIG. 1 in a complex plane.
Figure 10C:
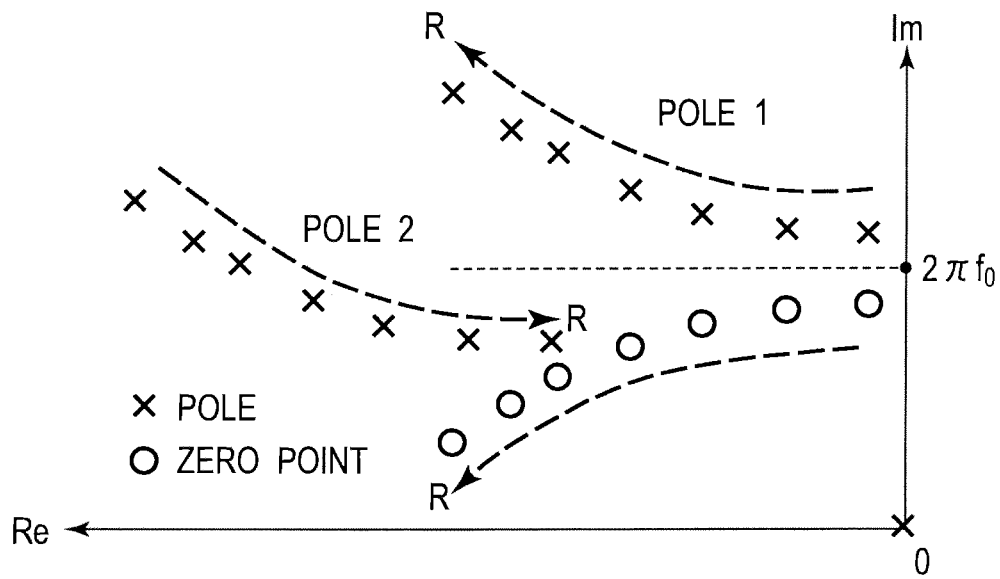
FIG. 10c is a representation illustrating the poles and the zero points of the input impedance ($Z_{in}$) of the contactless power feeding unit of FIG. 1 in the complex plane.

Next, description will be given with reference to FIGS. 10a to 10c with regard to the loci of poles and zero points of the input impedance ($Z_{in}$). FIG. 10a illustrates an equivalent circuit of the contactless power feeding unit 5 and the load unit 7, FIG. 10b illustrates the loci of the poles and the zero points of the input impedance ($Z_{in}$) when the coupling coefficient ($\kappa$) is varied, and FIG. 10c illustrates the loci of the poles and the zero points of the input impedance ($Z_{in}$) when the equivalent load resistance (R) is varied.

When the load unit 7 is replaced by an equivalent load resistance 701 (R), the equivalent circuit of the contactless power feeding unit 5 and the load unit 7 is represented by the circuit illustrated in FIG. 10a. The equivalent load resistance 701 (R) includes a resistance of the battery (unillustrated) included in the load 72, and the resistance value of the battery varies according to the state of charge (SOC) of the battery. Therefore, the resistance value of the equivalent load resistance 701 (R) does not always remain constant but varies according to the state of the battery or the like. The input impedance characteristic ($Z_{in}$) when viewed from the output side of the high-frequency AC power supply circuit 6, as expressed in terms of Laplace operator (s), is represented by Equation (7), based on the equivalent circuit illustrated in FIG. 10a.

$$Z_{in} = \frac{\alpha(M^2 - L_1L_2)C_{2p}C_{2s}Rs^5 + \alpha\beta M^2s^4 - C_{2s}(L_2C_{2p} + L_1\alpha)Rs^3 - L_1\alpha s^2 - RC_{2s}s - 1}{C_{1s}C_{1p}C_{2p}C_{2s}(M^2 - L_1L_2)Rs^6 + C_{1s}C_{1p}\beta M^2s^5 - C_{1s}C_{2s}(L_1C_{1p} + L_2C_{2p})Rs^4 - L_1C_{1s}C_{1p}s^3 - C_{1s}C_{2s}Rs^2 - C_{1s}s} \quad (7)$$

$$\left(\text{where } \alpha = C_{1s} + C_{1p},\ \beta = C_{2s} + C_{2p},\ M = \kappa\sqrt{L_1L_2}\right)$$

$Z_{in}$ represented by Equation (7) is represented by Equation (8) by making representative root approximation having a great influence on circuit characteristics.

$$Z_{in} \cong A\frac{|s-\gamma_1||s-\gamma_2|}{s|s-\lambda_1||s-\gamma_2|} \quad (8)$$

In the above equation, A denotes a coefficient formed of circuit parameters; $\lambda_1$, $\lambda_2$, the poles; and $\gamma_1$, $\gamma_2$, the zero points.

Then, when the coupling coefficient ($\kappa$) is increased from the vicinity of zero, the poles and the zero points describe the loci as illustrated in FIG. 10b. It is to be noted that the pole 1 illustrated in FIG. 10b indicates the pole of the nearest value to the imaginary axis side (although not containing zero), of the poles in Equation (8), that the pole 2 indicates the pole of the second nearest value to the imaginary axis side, of the poles in Equation (8), and that the zero point indicates the zero point of the nearest value to the imaginary axis side, of the zero points in Equation (8). Also, dashed arrows indicate the directions of the loci of the pole 1, the pole 2 and the zero point when the coupling coefficient ($\kappa$) is discretely increased. As illustrated in FIG. 10b, the pole 1 and the zero point describe the loci which are symmetric with respect to a short dashed line, while moving away from the imaginary axis, as the coupling coefficient ($\kappa$) increases. The short dashed line indicates a straight line on which driving points are taken as imaginary values, and the driving point (or the imaginary value of the point) has a value ($2\pi f_0$) corresponding to the frequency of the fundamental wave component. In other words, the pole 1 and the zero point make the loci which are symmetric with respect to the imaginary value ($2\pi f_0$) on the imaginary axis, as the coupling coefficient ($\kappa$) increases. Thereby, when the coupling coefficient ($\kappa$) is varied, a distance from the driving point to each of the poles 1 becomes equal to a distance from the driving point to the zero point corresponding to each of the poles 1, and thus, a change in the input impedance characteristic ($Z_{in}$) involved in a change in the coupling coefficient ($\kappa$) can be suppressed.

Also, the pole 2 makes the locus which approaches the pole 1 or the imaginary axis as the coupling coefficient ($\kappa$) increases. In other words, in the embodiment, the pole 1 which moves away from the imaginary axis as the coupling coefficient ($\kappa$) increases and the pole 2 which approaches the imaginary axis as the coupling coefficient ($\kappa$) increases are present, and the pole 1 and the pole 2 make the loci in opposite directions. Such a characteristic enables suppressing a variation in the phase involved in a change in the coupling coefficient ($\kappa$), thus maintaining the power factor, and hence preventing a loss of power.

Also, when the equivalent load resistance (R) is increased from the vicinity of zero, the poles and the zero points describe the loci as illustrated in FIG. 10c. It is to be noted that the pole 1 illustrated in FIG. 10c indicates the pole of the nearest value to the imaginary axis side (although not containing zero), of the poles in Equation (8), that the pole 2 indicates the pole of the second nearest value to the imaginary axis side, of the poles in Equation (8), and that the zero point indicates the zero point of the nearest value to the imaginary axis side, of the zero points in Equation (8). Also, dashed arrows indicate the directions of the loci of the pole 1, the pole 2 and the zero point when the equivalent load resistance (R) is discretely increased. As illustrated in FIG. 10c, the pole 1 and the zero point describe the loci which are symmetric with respect to a short dashed line, while moving away from the imaginary axis, as the coupling coefficient ($\kappa$) increases. The short dashed line indicates a straight line on which driving points are taken as imaginary values, and the driving point (or the imaginary value of the point) has a value ($2\pi f_0$) corresponding to the frequency of the fundamental wave component. In other words, the pole 1 and the zero point make the loci which are symmetric with respect to the imaginary value ($2\pi f_0$) on the imaginary axis, as the equivalent load resistance (R) increases. Thereby, when the equivalent load resistance (R) is varied, a distance from the driving point to each of the poles 1 becomes equal to a distance from the driving point to the zero point corresponding to each of the poles 1, and thus, a change in the input impedance characteristic ($Z_{in}$) involved in a change in the coupling coefficient ($\kappa$) can be suppressed.

Also, the pole 2 makes the locus which approaches the pole 1 or the imaginary axis as the equivalent load resistance (R) increases. In other words, in the embodiment, the pole 1 which moves away from the imaginary axis as the coupling coefficient ($\kappa$) increases and the pole 2 which approaches the imaginary axis as the coupling coefficient ($\kappa$) increases are present, and the pole 1 and the pole 2 make the loci in opposite directions. Such a characteristic enables suppressing a variation in the phase involved in a change in the equivalent load resistance (R), thus maintaining the power factor, and hence preventing a loss of power.

Figure 11A:
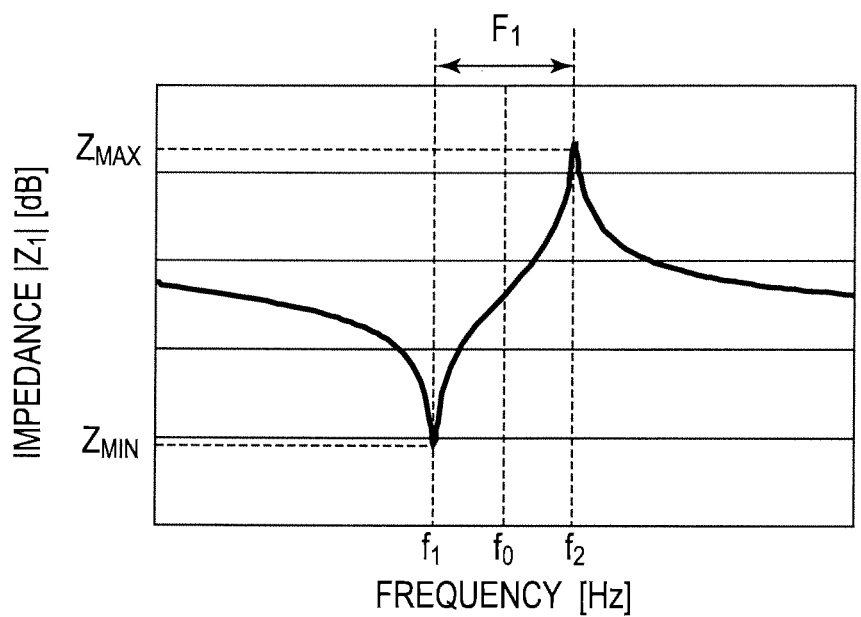
Figure 11B:
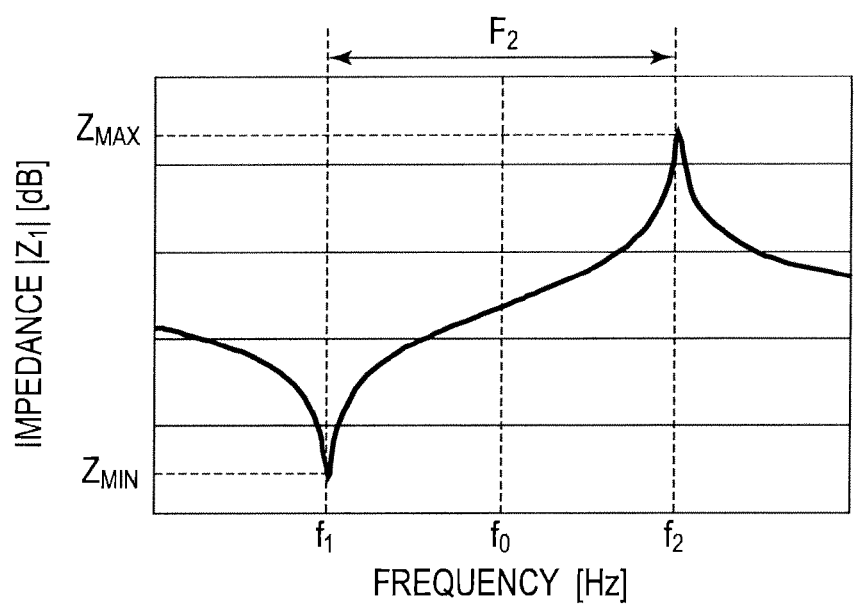
Figure 11C:
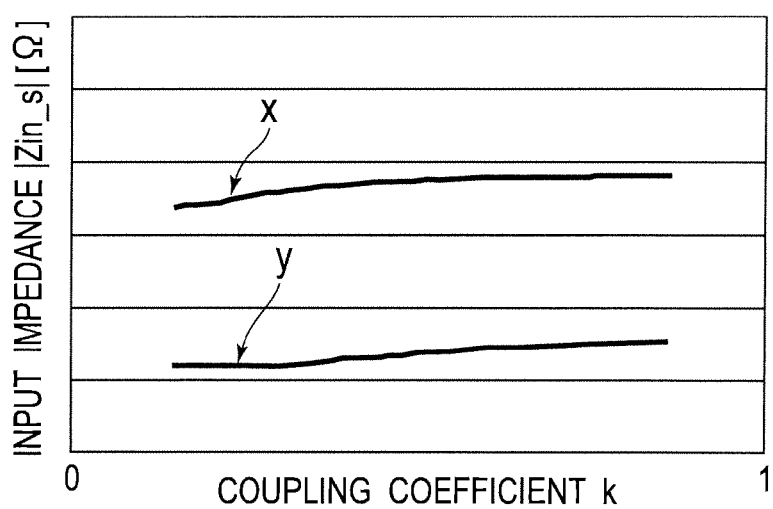
FIG. 11c is a graph illustrating the characteristic of the absolute value of the input impedance with respect to the coupling coefficient in the contactless power feeding unit of FIG. 1.

Next, description will be given with regard to a method for setting the absolute value ($|Z_{in\_s}|$) of the input impedance. Firstly, description will be given with reference to FIGS. 11a to 11c with regard to a relationship between the characteristic of the absolute value of the impedance ($Z_1$) and the absolute value ($|Z_{in\_s}|$). FIGS. 11a and 11b illustrate the characteristic of the impedance ($Z_1$) with respect to the frequency. FIG. 11e illustrates the characteristic of the absolute value ($|Z_{in\_s}|$) of the input impedance with respect to the coupling coefficient.

A frequency band ($F_1$) is set narrower than a frequency band ($F_2$), where $F_1$ indicates the frequency band between the frequency ($f_{1A}$) of the local minimum ($Z_{MIN}$) and the frequency ($f_{1B}$) of the local maximum ($Z_{MAX}$) (where $F_1=f_2-f_1$) as illustrated in FIG. 11a, and $F_2$ indicates the frequency band between the frequency ($f_{2A}$) of the local minimum ($Z_{MIN}$) and the frequency ($f_{2B}$) of the local maximum ($Z_{MAX}$) (where $F_2=f_2-f_1$) as illustrated in FIG. 11b. Incidentally, the frequency ($f_{1A}$) and the frequency ($f_{1B}$) are represented by Equation (2) and Equation (3), respectively. Then, when the frequency band is set to $F_1$ and the coupling coefficient ($\kappa$) is varied, the absolute value ($|Z_{in\_s}|$) of the input impedance has a characteristic as indicated by a graph x in FIG. 11c. Also, when the frequency band is set to $F_2$ and the coupling coefficient ($\kappa$) is varied, the absolute value ($|Z_{in\_s}|$) of the input impedance has a characteristic as indicated by a graph y in FIG. 11c. In other words, when the frequency band of $Z_{in}$ between the frequency of the local maximum and the frequency of the local minimum is set narrow, the absolute value ($|Z_{in\_s}|$) of the input impedance becomes high, while when the frequency band is set wide, the absolute value ($|Z_{in\_s}|$) of the input impedance becomes low. In the embodiment, therefore, the input impedance ($Z_{in\_s}|$) with respect to the frequency ($f_0$) can be set according to the frequency band of $Z_{in}$ between the frequency of the local maximum and the frequency of the local minimum.

Figure 12A:
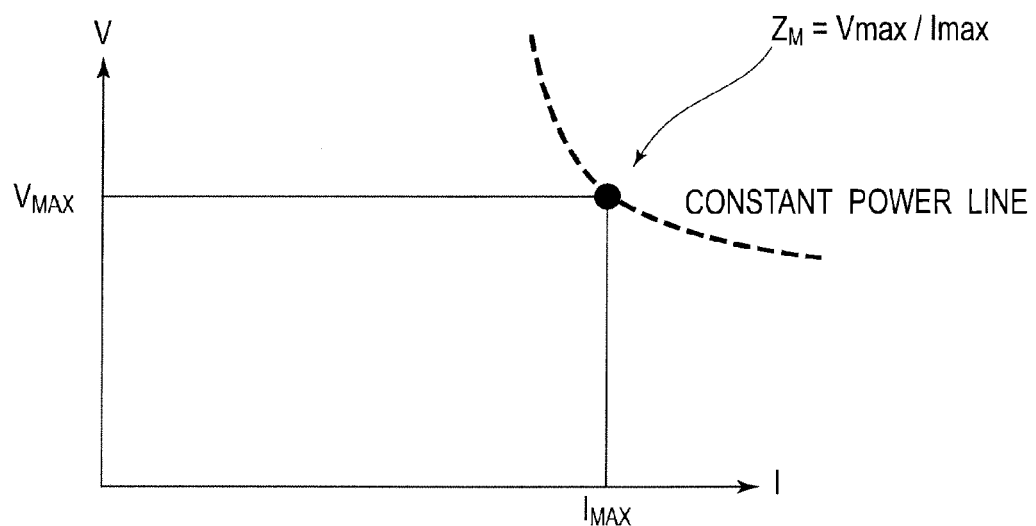
FIG. 12a is a graph illustrating the characteristic of output voltage with respect to output current in a high-frequency AC power supply unit of FIG. 1.
Figure 12B:
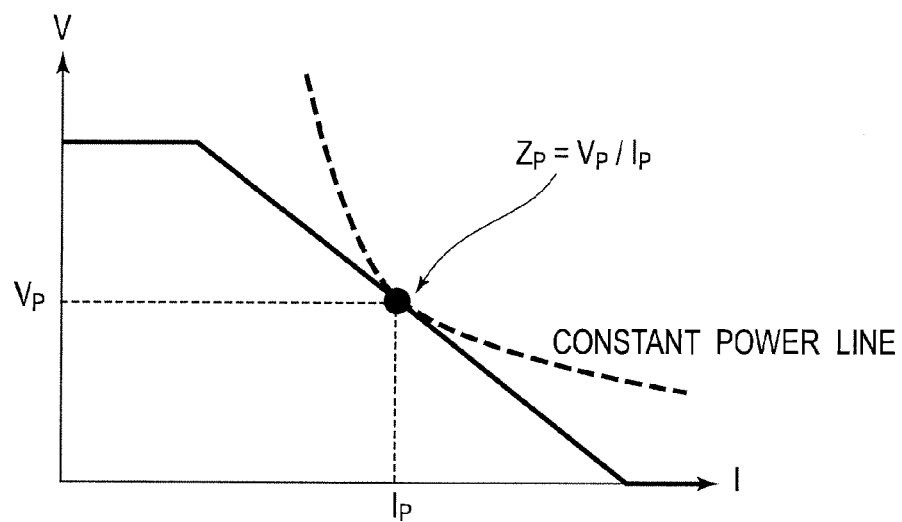
FIG. 12b is a graph illustrating the characteristic of the output voltage with respect to the output current in the high-frequency AC power supply unit of FIG. 1.

Description will be given with reference to FIGS. 12a and 12b with regard to a relationship between the absolute value ($|Z_{in\_s}|$) of the input impedance and the impedance of the high-frequency AC power supply unit 6. FIGS. 12a and 12b illustrate output current-output voltage characteristics of the high-frequency AC power supply unit 6, and, as an example, FIG. 12a illustrates the characteristics when the output voltage remains constant relative to the output current, and FIG. 12b illustrates the characteristics when the output voltage varies relative to the output current. Incidentally, the output current-output voltage characteristics of the high-frequency AC power supply unit 6 are determined according to characteristics of the inverter or a cooler (unillustrated) or the like included in the high-frequency AC power supply unit 6. Also, dashed line curves in FIGS. 12a and 12b each indicate a constant power line, and the constant power line has the same power value thereon.

As illustrated in FIG. 12a, when the output voltage remains constant relative to the output current, maximum power which can be supplied by the high-frequency AC power supply unit 6 is power determined by the product of maximum voltage ($V_{MAX}$) and maximum current ($I_{MAX}$). As described with reference to FIG. 6, it is necessary that the input impedance of the high-frequency AC power supply circuit 6 be adjusted for the impedance of the AC power supply 601 in order that the high-frequency AC power supply unit 6 supplies the maximum power. In the example illustrated in FIG. 12a, the impedance ($Z_M$) of the high-frequency AC power supply unit 6 is $V_{MAX}/I_{MAX}$, which is determined from the maximum voltage ($V_{MAX}$) and the maximum current ($I_{MAX}$). Then, the input impedance ($|Z_{in\_s}|$) with respect to the frequency ($f_0$) of the fundamental wave component of the high-frequency AC power supply circuit 6 is set equal to the impedance ($Z_M$) of the high-frequency AC power supply unit 6, and thereby, the high-frequency AC power supply unit 6 can supply the maximum power to the contactless power feeding unit 5.

As illustrated in FIG. 12b, when the output voltage varies relative to the output current, the maximum power that can be supplied by the high-frequency AC power supply unit 6 is power corresponding to a point of intersection of the highest constant power line and a current-voltage characteristic plot. The impedance ($Z_p$) of the high-frequency AC power supply unit 6 is $V_p/I_p$, which is determined from voltage ($V_p$) and current ($I_p$) corresponding to the point of intersection. Then, the input impedance ($|Z_{in\_s}|$) with respect to the frequency ($f_0$) of the fundamental wave component of the high-frequency AC power supply circuit 6 is set equal to the impedance ($Z_p$) of the high-frequency AC power supply unit 6, and thereby, the high-frequency AC power supply unit 6 can supply the maximum power to the contactless power feeding unit 5.

In other words, in the embodiment, the frequency band of $Z_{in}$ between the frequency of the local maximum and the frequency of the local minimum is set so that the absolute value ($|Z_{in\_s}|$) of the input impedance becomes equal to an impedance value corresponding to the maximum power of the high-frequency AC power supply unit 6. Thereby, the power that can be supplied by the high-frequency AC power supply unit 6 can be efficiently supplied to the contactless power feeding unit 5, and a power loss between the high-frequency AC power supply unit 6 and the contactless power feeding unit 5 can be suppressed.

Figure 13A:
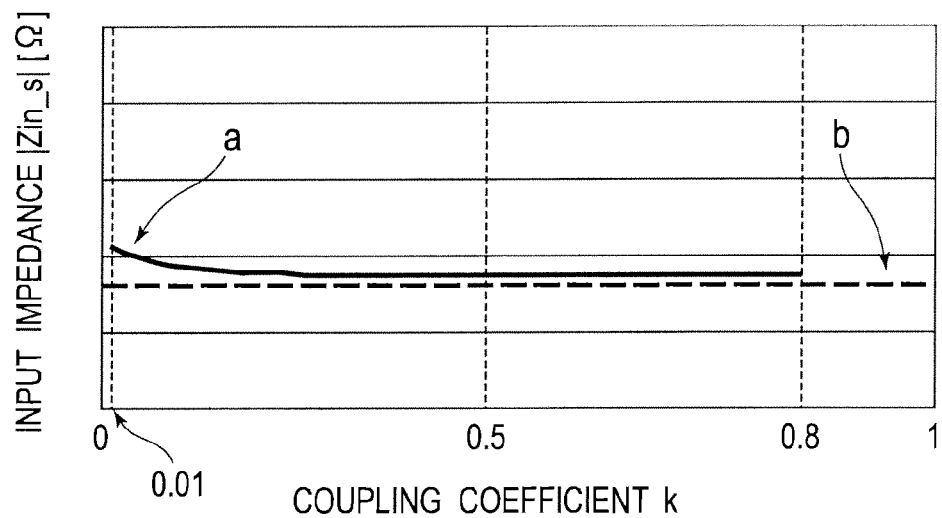
FIG. 13a is a graph illustrating the characteristic of the absolute value of the input impedance with respect to the coupling coefficient in the contactless power feeding unit of FIG. 1.
Figure 13B:
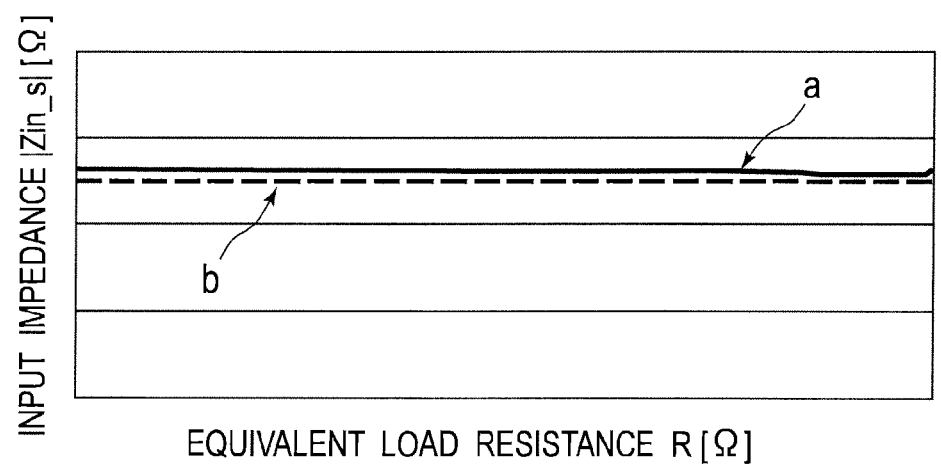
FIG. 13b is a graph illustrating the characteristic of the absolute value of the input impedance with respect to the equivalent load resistance in the contactless power feeding unit of FIG. 1.
Figure 13C:
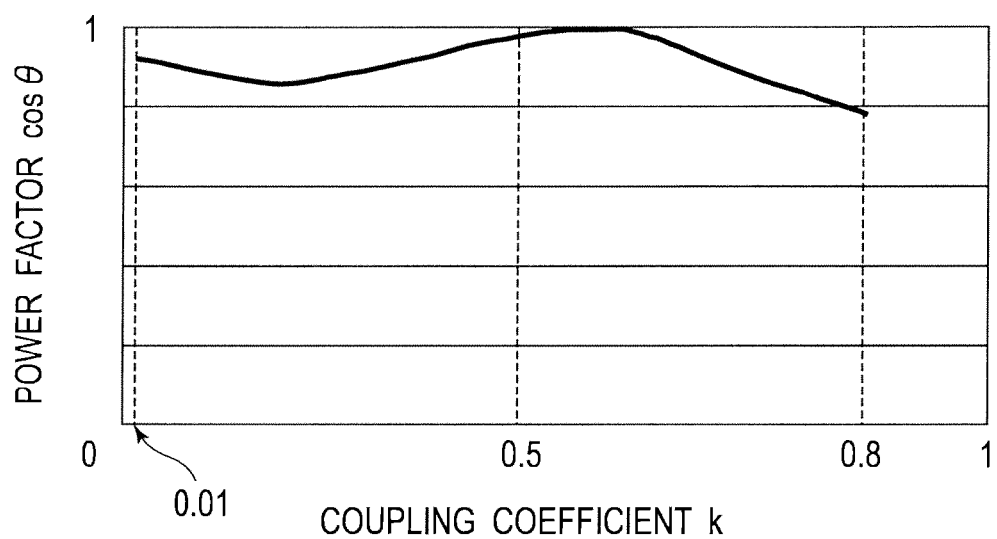
FIG. 13c is a graph illustrating the characteristic of the power factor with respect to the coupling coefficient in the contactless power feeding unit of FIG. 1.

Then, the circuit of the contactless power feeding unit 5 is set as described above, and thereby, the absolute value ($|Z_{in\_s}|$) of the input impedance of the contactless power feeding unit 5 of the embodiment has characteristics as illustrated in FIGS. 13a and 13b. Also, the power factor of the contactless power feeding unit 5 of the embodiment has a characteristic as illustrated in FIG. 13c. FIG. 13a illustrates the characteristic of the absolute value ($|Z_{in\_s}|$) of the input impedance with respect to the coupling coefficient ($\kappa$), FIG. 13b illustrates the characteristic of the absolute value ($|Z_{in\_s}|$) of the input impedance with respect to the equivalent load resistance (R), and FIG. 13c illustrates the characteristic of the power factor with respect to the coupling coefficient ($\kappa$). In FIGS. 13a and 13b, graphs a indicate the absolute value ($|Z_{in\_s}|$) of the input impedance, and graphs b indicate the absolute value of the impedance of the high-frequency AC power supply unit 6. Incidentally, the impedance of the high-frequency AC power supply unit 6 corresponds to the impedance ($Z_M$) in FIG. 12a and the impedance ($Z_p$) in FIG. 12b.

Also, in FIG. 13a, the coupling coefficient (κ) varies within a range of 0.01 to 0.8, including at least a range of 0.01 to 0.5.

As illustrated in FIG. 13a, the absolute value of the input impedance ($Z_{in}$) remains substantially constant with respect to a change in the coupling coefficient (κ) and has the same value as the impedance of the high-frequency AC power supply unit 6. In other words, even under conditions where the coupling coefficient (κ) varies, the absolute value of the input impedance ($Z_{in}$) with respect to the frequency ($f_0$) does not vary significantly from the absolute value ($|Z_{in\_s}|$) of the input impedance, and the absolute value of the input impedance ($Z_{in}$) with respect to the frequency ($f_0$) becomes equal to the absolute value of the impedance of the high-frequency AC power supply unit 6, so that a loss of power which the high-frequency AC power supply unit 6 supplies to the contactless power feeding unit 5 can be suppressed.

Also, as illustrated in FIG. 13b, the absolute value of the input impedance ($Z_{in}$) remains substantially constant with respect to a change in the equivalent load resistance (R) and has the same value as the impedance of the high-frequency AC power supply unit 6. In other words, even under conditions where the equivalent load resistance (R) varies, the absolute value of the input impedance ($Z_{in}$) with respect to the frequency ($f_0$) does not vary significantly from the absolute value ($|Z_{in\_s}|$) of the input impedance, and the absolute value of the input impedance ($Z_{in}$) with respect to the frequency ($f_0$) becomes equal to the absolute value of the impedance of the high-frequency AC power supply unit 6, so that a loss of power which the high-frequency AC power supply unit 6 supplies to the contactless power feeding unit 5 can be suppressed.

Also, as illustrated in FIG. 13c, the power factor remains substantially constant at a value near 1, with respect to a change in the coupling coefficient (κ). In other words, even under conditions where the coupling coefficient (κ) varies, the power factor does not vary significantly, and the power factor has the value near 1, so that a decrease in power feeding efficiency can be prevented.

Also, the circuit of the contactless power feeding unit 5 is set as described above, and thereby, when the coupling coefficient varies, power ($P_{out}$) which the contactless power feeding unit 5 outputs to the load unit 7 can be prevented from becoming low. Here, description will be given below with regard to the output power ($P_{out}$) to the load unit 7. In the contactless power feeding apparatus illustrated in FIG. 1, the output power ($P_{out}$) to the load unit 7 is expressed by supply power ($P_{in}$) which the high-frequency AC power supply unit 6 supplies to the contactless power feeding unit 5, and power ($P_{LOSS}$) lost in the contactless power feeding unit 5, as represented by Equation (9).

$$P_{out} = P_{in} - P_{Loss} \qquad (9)$$

Assuming that the power ($P_{LOSS}$) lost in the contactless power feeding unit 5 is sufficiently low as compared to the supply power ($P_{in}$), that is, $P_{in} \gg P_{LOSS}$, the output power ($P_{out}$) is approximated substantially equal to the supply power ($P_{in}$). Also, the supply power ($P_{in}$) is represented by the input impedance ($Z_{in}$) of the contactless power feeding unit 5 when viewed from the output side of the high-frequency AC power supply unit 6, and the phase difference (θ) between input voltage ($V_{in}$) and input current ($I_{in}$), provided that $V_{in}$ and $I_{in}$ indicate the input voltage and the input current, respectively, which the high-frequency AC power supply unit 6 inputs to the contactless power feeding unit 5. Therefore, Equation (9) is approximated by Equation (10).

$$P_{out} = \frac{|V_{in}|^2}{|Z_{in}|} \cos\theta_{in} - P_{Loss} \cong \frac{\cos\theta_{in}}{|Z_{in}|}|V_{in}|^2 \qquad (10)$$

Specifically, when the input voltage ($V_{in}$) is set constant, an output power coefficient ($\cos\theta_{in}/|Z_{in}|$) is maintained at a high value with respect to a change in the coupling coefficient, and thereby, the output power ($P_{out}$) to the load unit 7 can be heightened. In the embodiment, as described above, in the contactless power feeding unit 5, the absolute value ($|Z_{in\_s}|$) of the input impedance is set equal to the absolute value of the impedance of the high-frequency AC power supply unit 6 with respect to the change in the coupling coefficient, and moreover, the phase of the input impedance with respect to the frequency ($f_0$) is varied in the vicinity of zero. Thereby, under conditions where the coupling coefficient varies, the power factor can be maintained high while the absolute value ($|Z_{in\_s}|$) of the input impedance is kept constant, and thus, the output power coefficient is maintained at the high value. As a result, in the embodiment, a decrease in power feeding efficiency can be prevented even if the coupling coefficient varies.

Figure 14:
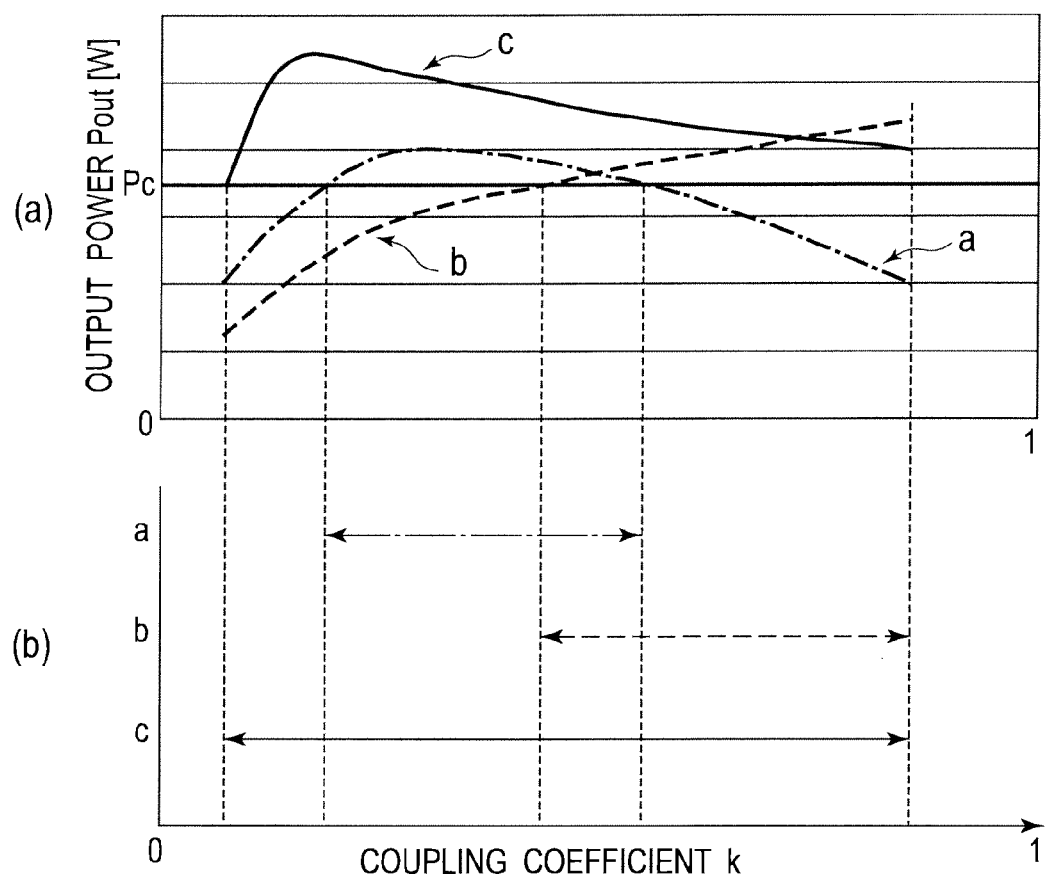
FIG. 14 Part (a) of FIG. 14 is a graph illustrating the characteristic of output power ($P_{out}$) with respect to the coupling coefficient ($\kappa$) in the contactless power feeding apparatus of FIG. 1, and Part (b) of FIG. 14 is a graph illustrating the range of the coupling coefficient ($\kappa$) which satisfies a predetermined power condition in the contactless power feeding apparatus of FIG. 1.

Description will be given with reference to FIG. 14(a) with regard to a characteristic of the output power ($P_{out}$) to the load unit 7 involved in a change in the coupling coefficient (κ). FIG. 14(a) is a graph illustrating the characteristic of the output power ($P_{out}$) with respect to the coupling coefficient (κ), and a graph a indicates the characteristic when the conventional circuit a is used as the contactless power feeding unit 5, a graph b indicates the characteristic when the conventional circuit b is used as the contactless power feeding unit 5, and a graph c indicates the characteristic of the embodiment. As illustrated in FIG. 14(a), the contactless power feeding apparatus of the embodiment can derive higher output power than the output power of the conventional circuit a and the conventional circuit b, over a wide range of variation in the coupling coefficient (κ).

Here, a power condition is set assuming that, when the output power ($P_{out}$) to the load unit 7 is equal to or more than threshold power (Pc), sufficient charging power can be supplied to the battery included in the load 72. FIG. 14(b) is a schematic graphical representation of assistance in explaining the range of the coupling coefficient (κ) which satisfies the power condition. In FIG. 14(b), a graph a represents the range which satisfies the power condition in the conventional circuit a, a graph b represents the range which satisfies the power condition in the conventional circuit b, and a graph c represents the range which satisfies the power condition in the embodiment. Incidentally, although the battery can be charged even if power less than the threshold power (Pc) is supplied to the load 72, charging time may become long, and therefore, under the power condition of the embodiment, the power less than the threshold power (Pc) is regarded as power which does not satisfy the condition.

As illustrated in FIG. 14(b), in the embodiment, the range of the coupling coefficient (κ) which satisfies the power condition is wider than the ranges in the conventional circuit a and the conventional circuit b. In the conventional circuit a and the conventional circuit b, a change in the coupling coefficient causes a significant change in the impedance of the frequency ($f_0$). Then, when there is a large amount of deviation of the value of the impedance of the frequency ($f_0$) from the value of the impedance of the high-frequency AC power supply unit 6, there are limitations imposed by the maximum voltage (or rated voltage) or the maximum current (or rated current) of the high-frequency AC power supply unit 6. In the conventional circuit a and the conventional circuit b, therefore, the range of the coupling coefficient (κ) which satisfies the power condition becomes narrow. Meanwhile, in the embodiment, a change in the absolute value ($|Z_{in\_s}|$) of the impedance of the frequency ($f_0$), incident to the change in the coupling coefficient, is suppressed, and the absolute value ($|Z_{in\_s}|$) of the impedance of the frequency ($f_0$) is set equal to the absolute value of the impedance of the high-frequency AC power supply unit 6. In the embodiment, therefore, the output power ($P_{out}$) can become higher and hence the range of the coupling coefficient (κ) which satisfies the power condition can become wider, as compared to the conventional circuit a and the conventional circuit b.

Figure 15:
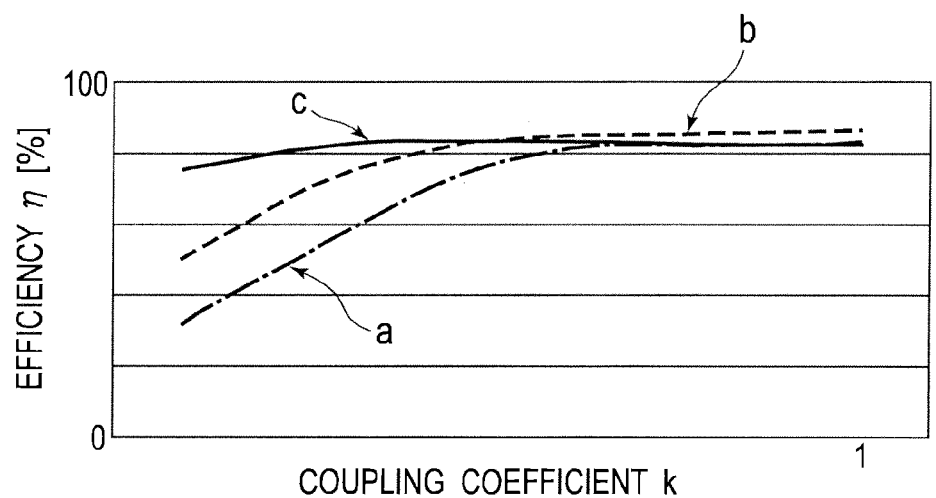
FIG. 15 is a graph illustrating the characteristic of efficiency with respect to the coupling coefficient in the contactless power feeding unit of FIG. 1.

Next, description will be given with reference to FIG. 15 with regard to power efficiency (η). FIG. 15 is a graph illustrating a characteristic of the efficiency (η) with respect to the coupling coefficient, and a graph a indicates the efficiency of the conventional circuit a, a graph b indicates the efficiency of the conventional circuit b, and a graph c indicates the efficiency of the present invention. Incidentally, the efficiency (η) is calculated by the output power ($P_{out}$)/the supply power ($P_{in}$)×100(%). As illustrated in FIG. 15, the efficiency (η) of the embodiment is maintained near 80% with respect to a change in the coupling coefficient (κ). Meanwhile, in a region where the coupling coefficient (κ) is low, the efficiency (η) of the conventional circuit a and the conventional circuit b is lower than 80%. In the conventional circuit a, as illustrated in FIG. 5c, the power factor deteriorates in the region where the coupling coefficient is low, and therefore, the efficiency falls off. Also, in the conventional circuit b, as illustrated in FIG. 5a, the input impedance value is small in the region where the coupling coefficient is low, and hence a current is high; however, current limitations are imposed by the rated current on the AC power supply side, and therefore, the current does not rise to or above the limited value of the current, and the input voltage also drops, so that the efficiency falls off. Meanwhile, in the embodiment, the absolute value of the input impedance is maintained at the value of the impedance of the high-frequency AC power supply unit, with respect to the change in the coupling coefficient, and the power factor is also maintained, so that the embodiment can maintain high efficiency.

In the embodiment, as described above, the impedance absolute-value characteristic of the impedance ($Z_1$) with respect to the frequency has the frequency ($f_0$) to be between the frequency ($f_{1B}$) where the local maximum ($Z_{MAX}$) exists and that is nearest to the frequency ($f_0$) of the fundamental wave component of the high-frequency AC power supply unit 6, and the frequency ($f_{1A}$) where the local minimum ($Z_{MIN}$) exists and that is nearest to the frequency ($f_0$) of the fundamental wave component of the high-frequency AC power supply unit 6, and the impedance absolute-value characteristic of the impedance ($Z_2$) with respect to the frequency has the frequency ($f_0$) to be between the frequency ($f_{2B}$) where the local maximum ($Z_{MAX}$) exists and that is nearest to the frequency ($f_0$) of the fundamental wave component of the high-frequency AC power supply unit 6, and the frequency ($f_{2A}$) where the local minimum ($Z_{MIN}$) exists and that is nearest to the frequency ($f_0$) of the fundamental wave component of the high-frequency AC power supply unit 6. Thereby, when the coupling coefficient varies, a change in the input impedance ($Z_{in}$) when viewed from the high-frequency AC power supply unit 6 side can be suppressed, and thus, a loss of power which the high-frequency AC power supply unit 6 supplies to the contactless power feeding unit 5 can be prevented. Also, in the embodiment, even when the coupling coefficient varies by displacement of the relative positions of the primary winding 101 and the secondary winding 201 from each other, a loss of supply power to the contactless power feeding unit 5 can be prevented. Also, when the coupling coefficient varies, the phase of the input impedance ($Z_{in}$) when viewed from the high-frequency AC power supply unit 6 side can be varied in the vicinity of zero, and thus, the power factor can be maintained high, so that a power loss (i.e. a power supply loss or a winding loss) in the contactless power feeding unit 5 can be suppressed. As a result, a power transmission distance corresponding to the distance between the primary winding 101 and the secondary winding 201 can be increased.

Also, in the present invention, the electrical capacitance ($C_{1s}$), the electrical capacitance ($C_{1p}$), the inductance ($L_1$), the inductance ($L_2$), the electrical capacitance ($C_{2p}$) and the electrical capacitance ($C_{2s}$) are set so that the following relationships are satisfied: $f_{1A} < f_0 < f_{1B}$; and $f_{2A} < f_0 < f_{2B}$. Thereby, when the coupling coefficient varies, a change in the input impedance ($Z_{in}$) when viewed from the high-frequency AC power supply unit 6 side can be suppressed, and thus, a loss of power which the high-frequency AC power supply unit 6 supplies to the contactless power feeding unit 5 can be prevented. Also, in the embodiment, even when the coupling coefficient varies by displacement of the relative positions of the primary winding 101 and the secondary winding 201 from each other, the power factor can be maintained high, and thus, a loss of supply power to the contactless power feeding unit 5 can be prevented, so that the power transmission distance corresponding to the distance between the primary winding 101 and the secondary winding 201 can be increased.

Also, in the present invention, the electrical capacitance ($C_{1s}$), the electrical capacitance ($C_{1p}$), the inductance ($L_1$), the inductance ($L_2$), the electrical capacitance ($C_{2p}$) and the electrical capacitance ($C_{2s}$) are set so that the following relationship is satisfied: $f_{1A} \leq f_{2A} < f_0 < f_{2B} \leq f_{1B}$. Thereby, when the coupling coefficient varies, a change in the input impedance ($Z_{in}$) when viewed from the high-frequency AC power supply unit 6 side can be suppressed, and thus, a loss of power which the high-frequency AC power supply unit 6 supplies to the contactless power feeding unit 5 can be prevented. Also, in the embodiment, even when the coupling coefficient varies by displacement of the relative positions of the primary winding 101 and the secondary winding 201 from each other, the power factor can be maintained high, and thus, a loss of supply power to the contactless power feeding unit 5 can be prevented, so that the power transmission distance corresponding to the distance between the primary winding 101 and the secondary winding 201 can be increased.

Also, in the embodiment, the absolute value ($|Z_{in\_s}|$) of the input impedance with respect to the frequency ($f_0$) of the fundamental wave component of the high-frequency AC power supply unit 6 is set according to the value of the impedance of the high-frequency AC power supply unit 6. Thereby, the absolute value ($|Z_{in\_s}|$) of the input impedance with respect to the frequency ($f_0$) can be set equal to the value of the impedance of the high-frequency AC power supply unit 6, and thus, even when the coupling coefficient varies, the maximum power that can be outputted by the high-frequency AC power supply unit 6 can be supplied to the contactless power feeding unit 5.

Also, in the embodiment, when the coefficient of coupling between the primary winding 101 and the secondary winding 201 varies within the range of 0.01 to 0.5 inclusive, the absolute value ($|Z_{in\_s}|$) of the input impedance with respect to the frequency ($f_0$) varies in the vicinity of the value of the impedance of the high-frequency AC power supply unit 6. Thereby, in the embodiment, even when the coupling coefficient varies, the maximum power that can be outputted by the high-frequency AC power supply unit 6 can be supplied to the contactless power feeding unit 5.

Also, in the embodiment, when the characteristic of the input impedance ($Z_{in}$) of the contactless power feeding unit 5 when viewed from the high-frequency AC power supply unit 6 side is represented in a complex plane, the pole 1 and the zero point that are nearest to the imaginary axis make the loci which are symmetric with respect to the value ($2\pi f_0$) corresponding to the frequency ($f_0$), on the imaginary axis, as the coupling coefficient increases, and the pole 2 that is the second nearest to the imaginary axis approaches the pole 1 as the coupling coefficient increases. Thereby, when the coupling coefficient ($\kappa$) is varied, the distance from the point indicating the imaginary value ($2\pi f_0$) on the imaginary axis to the pole becomes equal to the distance from the point indicating the imaginary value ($2\pi f_0$) on the imaginary axis to the zero point, and thus, a change in the input impedance characteristic ($Z_1$) involved in a change in the coupling coefficient ($\kappa$) can be suppressed. Also, the pole 1 and the pole 2 make the loci in opposite directions, which in turn enables suppressing a variation in the phase and thus maintaining the power factor. As a result, in the embodiment, a loss of power can be prevented.

Also, in the embodiment, a difference in frequency between the frequency ($f_{1A}$) and the frequency ($f_{1B}$) represented by Equation (2) and Equation (3), respectively, is set according to the impedance of the high-frequency AC power supply unit 6. In other words, the difference in frequency between the frequency ($f_{1A}$) and the frequency ($f_{1B}$) is set so that the absolute value ($|Z_{in\_s}|$) of the input impedance with respect to the frequency ($f_0$) becomes equal to the impedance of the high-frequency AC power supply unit 6, and thus, even when the coupling coefficient varies, the maximum power that can be outputted by the high-frequency AC power supply unit 6 can be supplied to the contactless power feeding unit 5.

Incidentally, the absolute value ($|Z_{in\_s}|$) of the input impedance is not necessarily required to be set equal to a fixed value with respect to a change in the coupling coefficient ($\kappa$) but may vary within a predetermined range within which the fixed value lies. Specifically, any value will do, provided that, as illustrated in FIG. 9a, when the absolute-value characteristic of the impedance is represented with respect to the change in the coupling coefficient ($\kappa$), a change in the absolute value of the impedance at the frequency ($f_0$) can be suppressed as compared to a change in the absolute value in any frequency band other than the frequency ($f_0$).

Also, it is not necessary that the absolute value ($|Z_{in\_s}|$) of the input impedance with respect to the frequency ($f_0$) be set equal to the value of the impedance of the high-frequency AC power supply unit 6 throughout the range of varying coupling coefficients. Any value will do, provided that, as illustrated in FIG. 13a, the absolute value ($|Z_{in\_s}|$) of the input impedance exhibits a characteristic such that the absolute value ($|Z_{in\_s}|$) is in the vicinity of the value of the impedance of the high-frequency AC power supply unit 6 in the range of varying coupling coefficients.

Also, in the embodiment, it is not necessarily required that the condition represented by Equation (6) be satisfied, and the frequency band between the frequency ($f_{1A}$) and the frequency ($f_{1B}$) and the frequency band between the frequency ($f_{2A}$) and the frequency ($f_{2B}$) may overlap each other at least in a portion of the bands.

Incidentally, the capacitor 102 of the embodiment corresponds to a "first capacitor" of the present invention; the capacitor 103, a "second capacitor" of the present invention; the capacitor 203, a "third capacitor" of the present invention; the capacitor 202, a "fourth capacitor" of the present invention; the contactless power feeding unit 5, a "power feeding circuit"; the high-frequency AC power supply unit 6, an "AC power supply"; the pole 1, a "first pole"; and the pole 2, a "second pole."

Second Embodiment

Figure 16:
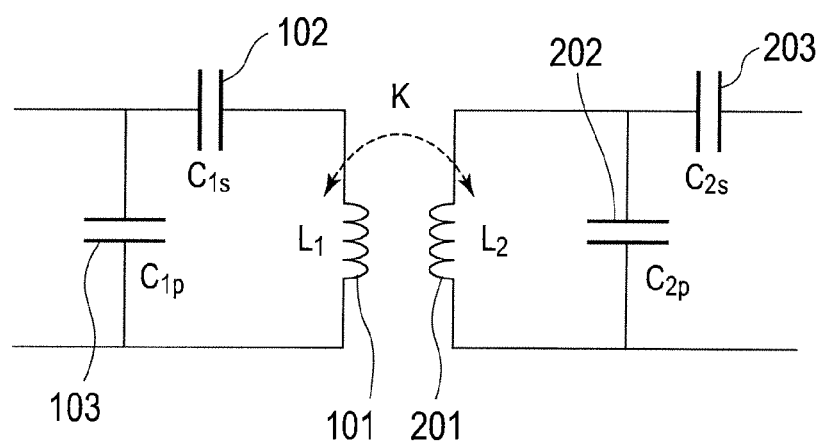
FIG. 16 is a circuit diagram of the contactless power feeding unit of a contactless power feeding apparatus according to another embodiment of the invention.

FIG. 16 is a circuit diagram of the contactless power feeding unit 5 of a contactless power feeding apparatus according to another embodiment of the invention. The second embodiment is different from the above-described first embodiment in respect of the connected position of the capacitor 102 in the power transmitting circuit of the contactless power feeding unit 5. Since other configurations are the same as those of the above-described first embodiment, description thereof will be incorporated.

As illustrated in FIG. 16, the power feeding circuit unit 5 includes the primary winding 101, the capacitor 102 connected in series with the primary winding 101, and the capacitor 103 connected in parallel with the primary winding 101, which form the power transmitting circuit, and the capacitor 102 is connected between the capacitor 103 and the primary winding 101. Also, the power feeding circuit unit 5 includes the secondary winding 201, the capacitor 202 connected in parallel with the secondary winding 201, and the capacitor 203 connected in series with the secondary winding 201, which form the power receiving circuit.

Figure 17:
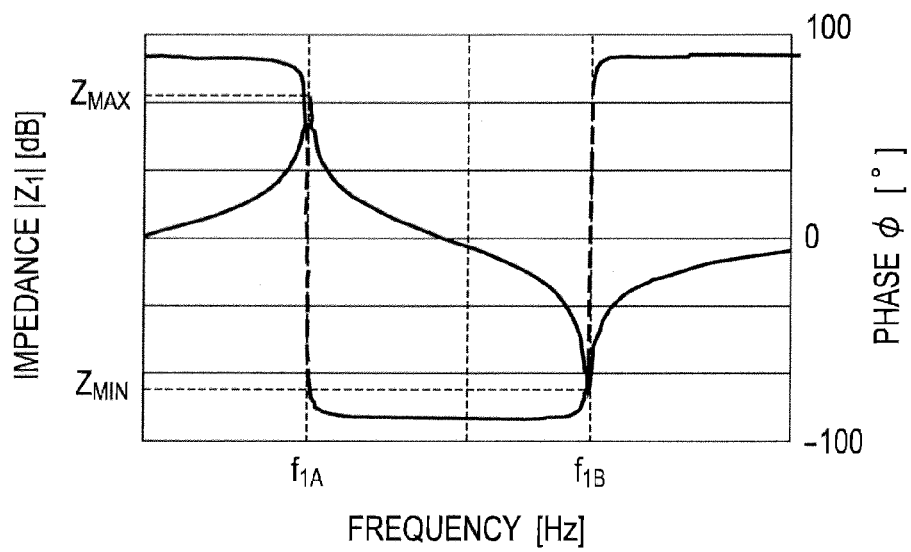
FIG. 17 is a graph illustrating the characteristic of the absolute value of the input impedance with respect to the frequency in a circuit on the primary side in the circuit of FIG. 16.

Next, description will be given with reference to FIG. 17 with regard to the impedance ($Z_1$) of just the primary side when viewed from the high-frequency AC power supply 6 side (or the power transmitting side), with the coupling coefficient set to zero, in the circuit illustrated in FIG. 16. FIG. 17 illustrates the absolute-value characteristic and the phase characteristic ($\phi$) of the impedance ($Z_1$) with respect to the frequency.

As illustrated in FIG. 8a, the characteristic of the impedance ($Z_1$) according to the first embodiment is that the local minimum ($Z_{MIN}$) exists at the low frequency ($f_{1A}$) and the local maximum ($Z_{MAX}$) exists at the high frequency ($f_{1B}$). Meanwhile, as illustrated in FIG. 17, the characteristic of the impedance ($Z_1$) of the second embodiment is that the local maximum ($Z_{MAX}$) exists at the low frequency ($f_{1A}$) and the local minimum ($Z_{MIN}$) exists at the high frequency ($f_{1B}$).

Then, the characteristic of the absolute value of the impedance ($Z_1$) has the frequency ($f_0$) of the fundamental wave component of the high-frequency AC power supply circuit 6 to be between the frequency ($f_{1A}$) where the local maximum ($Z_{MAX}$) exists, and the frequency ($f_{1B}$) where the local minimum ($Z_{MIN}$) exists.

As described above, on the power transmitting side of the contactless power feeding unit 5 of the second embodiment, one end of the capacitor 103 may be connected to a point of connection between the capacitor 102 and the primary winding 101, as is the case with the first embodiment, or the capacitor 102 may be connected between the capacitor 103 and the primary winding 101, as is the case with the second embodiment. Thereby, in the second embodiment, when the coupling coefficient varies, a change in the input impedance ($Z_{in}$) when viewed from the high-frequency AC power supply unit 6 side can be suppressed, and thus, a loss of power which the high-frequency AC power supply unit 6 supplies to the contactless power feeding unit 5 can be prevented. Also, in the second embodiment, even when the coupling coefficient varies by displacement of the relative positions of the primary winding 101 and the secondary winding 201 from each other, the power factor is maintained high, and thus, a loss of supply power to the contactless power feeding unit 5 can be prevented, so that the power transmission distance corresponding to the distance between the primary winding 101 and the secondary winding 201 can be increased.

Third Embodiment

Figure 18:
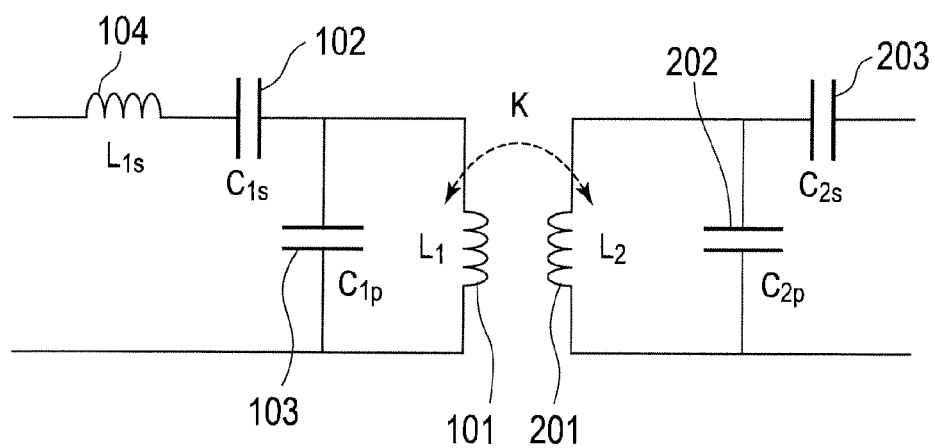
FIG. 18 is a circuit diagram of the contactless power feeding unit of a contactless power feeding apparatus according to still another embodiment of the invention.

FIG. 18 is a circuit diagram of the contactless power feeding unit 5 of a contactless power feeding apparatus according to still another embodiment of the invention. The third embodiment is different from the above-described first embodiment in that a coil 104 is provided in the power transmitting circuit of the contactless power feeding unit 5. Since other configurations are the same as those of the above-described first embodiment, description thereof will be incorporated.

As illustrated in FIG. 18, the contactless power feeding unit 5 includes the primary winding 101, the capacitor 102 connected in series with the primary winding 101, the capacitor 103 connected in parallel with the primary winding 101, and the coil 104, which form the power transmitting circuit, and a point of connection between the primary winding 101 and the capacitor 103 is connected to one end of the capacitor 102, and the coil 104 is connected to the other end of the capacitor 102. The coil 104 is interposed as a choke coil to suppress harmonics of an output from the high-frequency AC power supply unit 6, or is interposed for the purpose of preventing a short circuit or doing the like.

Figure 19:
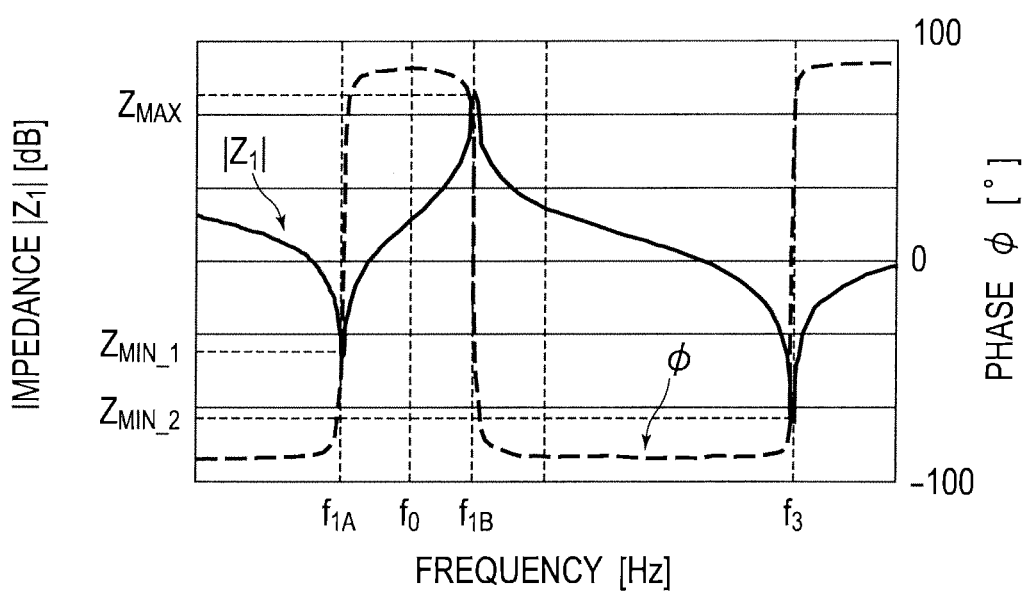
FIG. 19 is a graph illustrating the characteristic of the absolute value of the input impedance with respect to the frequency in a circuit on the primary side in the circuit of FIG. 18.

Next, description will be given with reference to FIG. 19 with regard to the impedance ($Z_1$) of just the primary side when viewed from the high-frequency AC power supply 6 side (or the power transmitting side), with the coupling coefficient set to zero, in the circuit illustrated in FIG. 18. FIG. 19 illustrates the characteristic of the absolute value of the impedance ($Z_1$) with respect to the frequency. In the third embodiment, the coil 104 is connected to the contactless power feeding unit 5, and thus, a resonance system formed of $L_1$ and ($C_{1s}+C_{1p}+L_{1s}$) is formed, so that a resonance frequency ($f_3$) is added to the contactless power feeding unit 5 of the first embodiment. As illustrated in FIG. 19, the characteristic of the absolute value of the impedance ($Z_1$) has the frequency ($f_0$) of the fundamental wave component of the high-frequency AC power supply circuit 6 to be between the frequency ($f_{1A}$) where a local minimum ($Z_{MIN\_1}$) exists, and the frequency ($f_{1B}$) where the local maximum ($Z_{MAX}$) exists. Of the resonance frequencies of the impedance ($Z_1$), the frequency ($f_{1A}$) is the frequency corresponding to the local minimum that is nearest to the frequency ($f_0$), and, of the resonance frequencies of the impedance ($Z_1$), the frequency ($f_{1B}$) is the frequency corresponding to the local maximum that is nearest to the frequency ($f_0$). Also, the characteristic of the absolute value of the impedance ($Z_1$) has the resonance frequency ($f_3$) where a local minimum ($Z_{MIN\_2}$) exists, in a band other than the frequency band between the frequency ($f_{1A}$) and the frequency ($f_{1B}$). In other words, the characteristic of the absolute value of the impedance ($Z_1$) has the frequency ($f_0$) and does not have the resonance frequency ($f_3$) where the local minimum ($Z_{MIN\_2}$) exists, in the frequency band between the frequency ($f_{1A}$) and the frequency ($f_{1B}$).

As described above, on the power transmitting side of the contactless power feeding unit 5 of the third embodiment, the coil 104 may be connected to the capacitor 102, and any configuration will do, at least provided that the characteristic of the absolute value of the impedance ($Z_1$) has the frequency ($f_0$) of the fundamental wave component of the high-frequency AC power supply circuit 6 to be between the frequency ($f_{1A}$) where the local minimum ($Z_{MIN\_1}$) exists, and the frequency ($f_{1B}$) where the local maximum ($Z_{MAX}$) exists.

Thereby, in the third embodiment, when the coupling coefficient varies, a change in the input impedance ($Z_{in}$) when viewed from the high-frequency AC power supply unit 6 side can be suppressed, and thus, a loss of power which the high-frequency AC power supply unit 6 supplies to the contactless power feeding unit 5 can be prevented. Also, in the third embodiment, even when the coupling coefficient varies by displacement of the relative positions of the primary winding 101 and the secondary winding 201 from each other, the power factor is maintained high, and thus, a loss of supply power to the contactless power feeding unit 5 can be prevented, so that the power transmission distance corresponding to the distance between the primary winding 101 and the secondary winding 201 can be increased.

Incidentally, in the third embodiment, a circuit element other than the coil 104 may be connected or plural circuit elements may be connected on the power transmitting side of the contactless power feeding unit 5, and any configuration will do, at least provided that the characteristic of the absolute value of the impedance ($Z_1$) has the frequency ($f_0$) of the fundamental wave component of the high-frequency AC power supply circuit 6 to be between the frequency ($f_{1A}$) where the local minimum ($Z_{MIN\_1}$) exists, and the frequency ($f_{1B}$) where the local maximum ($Z_{MAX}$) exists.

Also, in the third embodiment, on the power transmitting side of the contactless power feeding unit 5, other circuit elements may be connected to the circuit illustrated in FIG. 16, and any configuration will do, at least provided that the characteristic of the absolute value of the impedance ($Z_1$) has the frequency ($f_0$) of the fundamental wave component of the high-frequency AC power supply circuit 6 to be between the frequency ($f_{1A}$) where the local minimum ($Z_{MIN\_1}$) exists, and the frequency ($f_{1B}$) where the local maximum ($Z_{MAX}$) exists.

Also, in the third embodiment, other circuit elements may be connected on the power receiving side of the contactless power feeding unit 5, and any configuration will do, at least provided that the characteristic of the absolute value of the impedance ($Z_2$) has the frequency ($f_0$) of the fundamental wave component of the high-frequency AC power supply circuit 6 to be between the frequency ($f_{2A}$) where the local minimum ($Z_{MIN}$) exists, and the frequency ($f_{2B}$) where the local maximum ($Z_{MAX}$) exists.

REFERENCE SIGNS LIST 11 positive electrode
6 high-frequency AC power supply unit
61 rectifier
61a to 61f diodes
62 smoothing capacitor
63 voltage control type inverter
63a to 63d transistors switching elements
64 three-phase AC power supply
7 load unit
71 rectifier unit
71a to 71d diodes
72 load
5 contactless power feeding unit
3 power transmitting circuit unit
101 primary winding
102, 103 capacitors
104 coil
4 power receiving circuit unit
201 secondary winding
202, 203 capacitors
701 equivalent load resistance

The invention claimed is:

1. A contactless power feeding apparatus comprising a secondary winding to which power is supplied from a primary winding by an AC power supply, wherein
an impedance absolute-value characteristic of Z1 with respect to a frequency has a frequency of a fundamental wave component of the AC power supply to be between a frequency where a local maximum exists and that is nearest to the frequency of the fundamental wave component of the AC power supply, and a frequency where a local minimum exists and that is nearest to the frequency of the fundamental wave component, and
an impedance absolute-value characteristic of Z2 with respect to the frequency has the frequency of the fundamental wave component to be between a frequency where the local maximum exists and that is nearest to the frequency of the fundamental wave component of the AC power supply, and a frequency where the local minimum exists and that is nearest to the frequency of the fundamental wave component,
where Z1 indicates the impedance of just a primary side when viewed from an output side of the AC power supply, and Z2 indicates an impedance of just a secondary side when viewed from a side of a load to be connected to the secondary winding.

2. The contactless power feeding apparatus according to claim 1, wherein a first capacitor is connected in series with the primary winding, a second capacitor is connected in parallel with the primary winding, a third capacitor is connected in series with the secondary winding, and a fourth capacitor is connected in parallel with the secondary winding, and the following relationships are satisfied: $f_{1A}<f_0<f_{1B}$; and $f_{2A}<f_0<f_{2B}$, provided that the following equations are satisfied:

$$f_{1A} = \frac{1}{2\pi\sqrt{L_1(C_{1s}+C_{1p})}},$$

$$f_{1B} = \frac{1}{2\pi\sqrt{L_1 C_{1p}}},$$

$$f_{2A} = \frac{1}{2\pi\sqrt{L_2(C_{2S}+C_{2p})}}, \text{ and}$$

$$f_{2B} = \frac{1}{2\pi\sqrt{L_2 C_{2p}}},$$

where
$C_{1s}$ denotes an electrical capacitance of the first capacitor,
$C_{1p}$ denotes an electrical capacitance of the second capacitor,
$L_1$ denotes an inductance of the primary winding,
$C_{2s}$ denotes an electrical capacitance of the third capacitor,
$C_{2p}$ denotes an electrical capacitance of the fourth capacitor,
$f_0$ denotes the frequency of the fundamental wave component of the AC power supply, and
$L_2$ denotes an inductance of the secondary winding.

3. The contactless power feeding apparatus according to claim 2, wherein the following relationship is satisfied: $f_{1A} \le f_{2A} < f_0 < f_{2B} \le f_{1B}$.

4. The contactless power feeding apparatus according to claim 1, wherein an absolute value of $Z_{in}$ with respect to the frequency of the fundamental wave component is set according to a value of impedance of the AC power supply, where $Z_{in}$ indicates an input impedance of a power feeding circuit including the primary winding and the secondary winding when viewed from the output side of the AC power supply.

5. The contactless power feeding apparatus according to claim 1, wherein, when a coefficient of coupling between the primary winding and the secondary winding varies within a range of 0.01 to 0.5 inclusive, an absolute value of $Z_{in}$ with respect to the frequency of the fundamental wave component varies in the vicinity of a value of impedance of the AC power supply, where $Z_{in}$ indicates an input impedance of the power feeding circuit including the primary winding and the secondary winding when viewed from an output side of the AC power supply.

6. The contactless power feeding apparatus according to claim 1, wherein a first capacitor is connected in series with the primary winding, a second capacitor is connected in parallel with the primary winding, a third capacitor is connected in series with the secondary winding, and a fourth capacitor is connected in parallel with the secondary winding, and, when a characteristic of the input impedance of the power feeding circuit including the primary winding and the secondary winding when viewed from the output side of the AC power supply is represented in a complex plane, a first pole and a zero point that are nearest to an imaginary axis make loci which are symmetric with respect to a value corresponding to the frequency of the fundamental wave component, on the imaginary axis, as a coefficient of coupling between the primary winding and the secondary winding increases, and a second pole that is the second nearest to the imaginary axis approaches the first pole as the coupling coefficient increases.

7. The contactless power feeding apparatus according to claim 1, wherein a first capacitor is connected in series with the primary winding, a second capacitor is connected in parallel with the primary winding, a third capacitor is connected in series with the secondary winding, and a fourth capacitor is connected in parallel with the secondary winding, and a difference in frequency between $f_{1A}$ and $f_{1B}$ in an input impedance of the power feeding circuit including the primary winding and the secondary winding when viewed from an output side of the AC power supply is set according to the impedance of the AC power supply, where the following equations are satisfied:

$$f_{1A} = \frac{1}{2\pi\sqrt{L_1(C_{1s}+C_{1p})}}, \text{ and}$$

$$f_{1B} = \frac{1}{2\pi\sqrt{L_1 C_{1p}}},$$

where $C_{1s}$ denotes an electrical capacitance of the first capacitor, $C_{1p}$ denotes an electrical capacitance of the second capacitor, and $L_1$ denotes an inductance of the primary winding.

* * * * *